(12) United States Patent
Vega et al.

(10) Patent No.: US 7,913,009 B2
(45) Date of Patent: Mar. 22, 2011

(54) MONITORED NOTIFICATION FACILITY FOR REDUCING INTER-PROCESS/INTER-PARTITION INTERRUPTS

(75) Inventors: René Vega, Kirkland, WA (US); John Te-Jui Sheu, Redmond, WA (US); Yau Ning Chin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 11/765,990

(22) Filed: Jun. 20, 2007

(65) Prior Publication Data

US 2008/0320194 A1  Dec. 25, 2008

(51) Int. Cl.
*G06F 13/42* (2006.01)
(52) U.S. Cl. ......... 710/106; 710/240; 710/260; 710/200
(58) Field of Classification Search .......... 710/260–269, 710/240–244, 105–106, 200
See application file for complete search history.

(56) References Cited

U.S. PATENT DOCUMENTS

| | | | | |
|---|---|---|---|---|
| 5,274,823 A | | 12/1993 | Brenner et al. | 710/200 |
| 5,511,230 A | * | 4/1996 | Ryu | 710/45 |
| 5,790,804 A | | 8/1998 | Osborne | 709/245 |
| 6,085,277 A | | 7/2000 | Nordstrom et al. | 710/263 |
| 6,185,652 B1 | | 2/2001 | Shek et al. | 710/263 |
| 6,209,054 B1 | | 3/2001 | Lee | 710/310 |
| 6,356,963 B1 | | 3/2002 | Maguire et al. | 710/48 |
| 6,412,035 B1 | | 6/2002 | Webber | 710/261 |
| 6,467,008 B1 | * | 10/2002 | Gentry et al. | 710/261 |
| 6,748,444 B1 | * | 6/2004 | Nagashima | 709/236 |
| 2004/0111593 A1 | | 6/2004 | Arimilli et al. | 712/244 |
| 2005/0246461 A1 | * | 11/2005 | Accapadi et al. | 710/200 |
| 2005/0278719 A1 | | 12/2005 | Togawa | 718/100 |

OTHER PUBLICATIONS

Brewer, E. et al., "Remote Queues: Message Queues for Optimization and Atomicity," *SPAA*, Santa Barbara, CA, 1995, 42-53.
Peterson, L. et al., "Preserving and Using Context Information in Interprocess Communication," *ACM Transactions on Computer Systems*, 1989, 7(3), 217-246.
Shimizu, T. et al., "Low-Latency Message Communication Support for the AP1000," *ACM*, 1992, 288-297.

* cited by examiner

*Primary Examiner* — Paul R Myers
*Assistant Examiner* — Kim T Huynh
(74) *Attorney, Agent, or Firm* — Woodcock Washburn LLP

(57) ABSTRACT

Example operations related to deferring interrupts are herein disclosed. In one example embodiment, a method includes, but is not limited to, writing a message to a memory location shared between a sender and a receiver; and requesting that an interrupt be transmitted to the receiver after a specified latency has elapsed, wherein an interrupt that is pending is stored in a trigger memory. It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer. In addition to the foregoing, other aspects are described in the claims, drawings, and text forming a part of the present application.

20 Claims, 22 Drawing Sheets

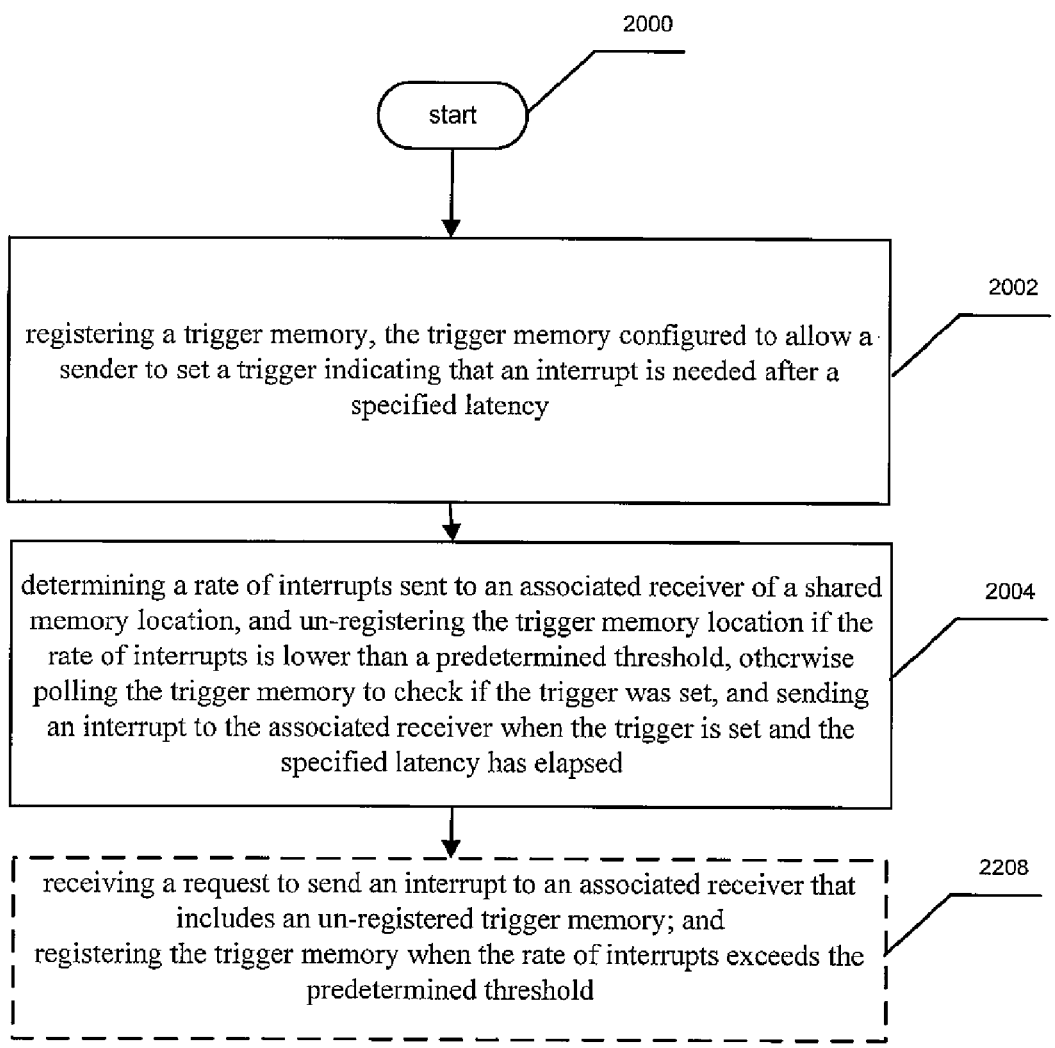

MONITORED NOTIFICATION FACILITY FOR REDUCING INTER-PROCESS/INTER-PARTITION INTERRUPTS

BACKGROUND

In inter-process communication schemes, there are generally at least two processes that are independent from each other, i.e., each process can not be affected by the other process and the data for each process is generally not shared with the other processes. Since processes could be independent, in order to exchange data they must implement a mechanism that allows them to send data and information back and forth. One mechanism that may be used is a shared memory model. In a shared memory model, a region of memory may be shared by cooperating processes that communicate with each other by writing and reading messages from the shared memory area. In a shared memory model, a process can be configured to continuously pull messages from the shared memory, or in other situations, it can be configured to only process messages once it has received an interrupt directing it to process any messages in the shared memory. In the first situation, the performance of the computer system can be severe due to the fact that the processor will be continuously utilizing computer cycles to poll the shared memory instead of using them for other activities. Since it is, generally speaking, impractical to continuously check a shared memory location for messages a process sends a signal, or an interrupt, to the other process notifying it that there is a message to process. As stated above, when the receiver is actively polling the shared memory location, an interrupt is not necessary because the receiver will process messages, however when a process is not checking the shared memory location an interrupt is needed in order to direct it to process messages. Sending an interrupt typically requires a control switch to the operating system kernel, or a privileged process. In lightly loaded systems, the CPU cost of sending and taking interrupts may be low, and performance of the system may not be impacted. However, when the load on the system is moderate to high, the cost of taking interrupts may severely impact the performance of the system, especially if a control switch is required to process the message. Similarly, virtual machines running on a virtual machine monitor (VMM) may need to pass messages from one machine to another via inter-partition communication schemes. Two virtual machines may also share a memory location to send messages, and the cost of sending and servicing interrupts in a moderately to highly loaded system, such as a virtualization server, may impact the performance of the system. In virtualized systems an interrupt can be sent by a VMM, also known as a privileged process.

SUMMARY

In embodiments of the present disclosure, a method is provided for handling a message sent from a sender to a receiver over a channel that includes, but is not limited to, writing a message to a memory location shared between a sender and a receiver; and requesting that an interrupt be transmitted to the receiver after a specified latency has elapsed, wherein an interrupt that is pending is stored in a trigger memory.

In another embodiment of the present disclosure, a method is provided for sending an interrupt deferred for a specified latency. In this exemplary embodiment, the method includes, but is not limited to, registering a trigger memory with a privileged process, and polling the trigger memory to determine if a sender has set a trigger associated with a specified latency, and sending an interrupt to an associated receiver when the trigger is set, and the specified latency has elapsed.

In at least one embodiment of the present disclosure, a sender, and a receiver may be asynchronously processing messages that typically result in each of the sender, and receiver sending messages back and forth to each other. In this example embodiment, this activity may be utilized by the sender and receiver to, for example, poll the trigger memory and cancel a pending deferred interrupt while, for example, it is writing its own message.

In other embodiments, instead of polling the shared memory, the kernel or virtual machine monitor may record how many interrupts are sent to the associated process or virtual machine. In the instance that the system load is low, and interrupts are not sent often, the kernel, or virtual machine monitor, may stop polling the memory location or reduce the polling frequency.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer. In addition to the foregoing, other aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 22 illustrates an alternative embodiment of the example operational procedure of FIG. 20.

DETAILED DESCRIPTION OF ILLUSTRATIVE EMBODIMENTS

Figure 1:
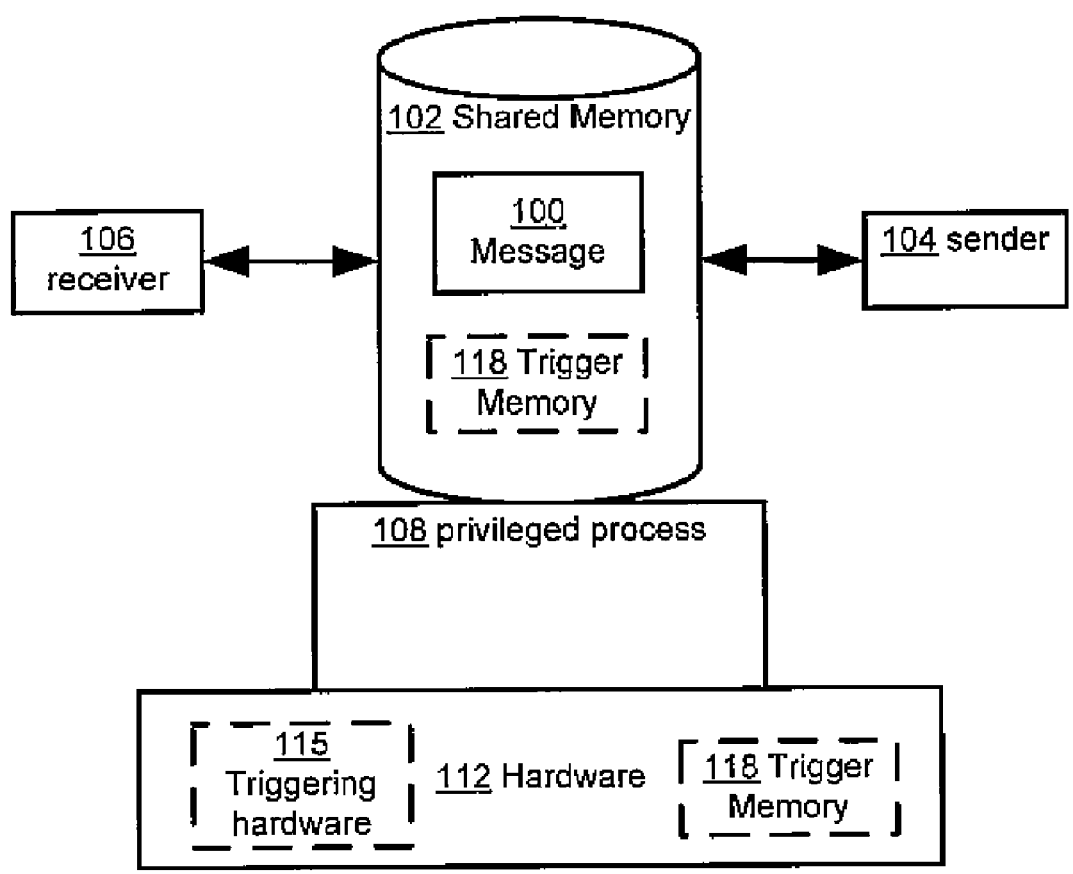
FIG. 1 illustrates an example system wherein aspects of the present disclosure may be implemented.

The example system of FIG. 1 is described in more detail below with respect to how the elements depicted interrelate with the operational procedures illustrated in the flow charts FIG. 3 through FIG. 22. One skilled in the art will note that the example elements depicted in FIG. 1 are provided to show an operational context to practice aspects of the present disclosure. Thus, the example operational context is to be treated as illustrative only and in no way limit the scope of the claims. Furthermore, those skilled in the art will note that some elements depicted in FIG. 1 are indicated in dashed lines, which in general, and throughout the disclosure, is indicative of the fact that they are considered optional and/or they are considered to be optionally located at their position within their respective figure.

Generally speaking, a sender 104 may include, but is not limited to, a process, e.g., an instance of a computer program, or a virtual machine, i.e., an execution environment associated with other execution environments that shares the physical hardware of a computer system, and similarly a receiver 106 can also include another process or virtual machine. One skilled in the art will note that whether the process or virtual machine, is a sender 104 or a receiver 106, depends on whether an individual process or machine is reading or writing to the shared memory location 102 at a particular moment in time, e.g., in a system where messages are passed back and forth between two virtual machines one virtual machine may be the sender for one message, and the receiver for the next massage passed. Additionally, one skilled in the art will appreciate that a shared memory location may service multiple communication channels in either direction. Thus, in each shared memory location both processes or virtual machines could be sending and/or receiving at the same time.

As depicted in FIG. 1, the sender 104 and receiver 106 may be maintained by a privileged process 108. For example, in some example embodiments of the present disclosure, the privileged process 108 may include an operating system with a kernel. In these example embodiments, the operating system may be one such as an operating system from the Microsoft operating system product line, or any other operating system that includes a kernel. In other example embodiments, the operational procedures may be practiced in a virtualized system, i.e., the virtual machines may each include an operating system, and each virtual machine may be managed by a virtual machine monitor, e.g., a program that creates and manages virtual machines. In both example systems, each virtual machine or process may be isolated from each other except for shared memory 102 (one or more buffers that, in some embodiments, may be thought of as a bus) that is shared between the two virtual machines or processes. The kernel or virtual machine monitor may run on hardware 112 that includes, for example, RAM, one or more processors (CPUs), and one or more input/output devices such as cd-rom drives, hard drives, keyboards, network cards or any other subsystem that can receive a request to perform an operation, and output a result. In some embodiments of the present disclosure, the privileged process 108 may have accesses to, or control of, triggering hardware 115 that may include, but is not limited to, hardware such as an interrupt controller, or any circuitry configured to receive requests for interrupts from a sender 104, or a privileged process 108, and send interrupts to the associated receiver 106 after a specified latency has elapsed.

The above referenced elements, e.g., a sender, a receiver, and a privileged process may be configured to pass messages back and forth via the shared memory location 102. Generally speaking, a message 100 may include, but is not limited to, a function invocation, a signal, and/or a data packet that contains information. Inter-process/inter-partition communication schemes are used by processes, and virtual machines, to pass messages to each other since the processes, or virtual machines, are isolated from each other as shown in FIG. 1. These IPCs are generally written to a shared memory 102 by a sender 104 and read out by a receiver 106. Message exchanges in systems similar to FIG. 1 may be accomplished by running inter-process/partition communication code on one, or both of each process or virtual machine, or in other example embodiments the privileged process 108. In one embodiment, when the sender has detected (via, a method or procedure) that the receiver is not reading messages from the shared memory location 102, the sender 104 can write a message 100 to the shared memory location 102 and request that one or more bits indicative of a deferred interrupt be set in the trigger memory 118. In one example, the trigger memory 118 may be stored in the shared memory location 102, or in a page controlled by the privileged process 108, however one skilled in the art will appreciate that hardware such as triggering hardware 115 can be configured to receive requests for interrupts from a sender 104 and store one or more bits of information indicative of a deferred interrupt in a trigger memory 118 such as one or more registers that are located within, or coupled to, the triggering hardware 115. One skilled in the art will appreciate that the location of trigger memory 118 (in shared memory, or coupled to triggering hardware), and the type of memory used (RAM or registers), are design choices within the knowledge of those skilled in the art, and the selection of a specific location for, and type of, memory are related to design choices of one skilled in the art, thus the present disclosure is not limited to having trigger memory 118 at any particular location or using any type of memory for trigger memory 118.

With respect to writing a message into shared memory 102, and requesting that a trigger be set in trigger memory 118, the write operation for sending a message 100 and requesting an interrupt may be incorporated into a single write statement or may include multiple write statements, e.g., the code operable to write to the shared memory location 102 may include code operable to request that one or more bits indicative of a deferred interrupt be written, or in other embodiments, the code for writing a message may be invoked and then the code for requesting a deferred interrupt may be invoked. Thus, a sender 104 may write a message 100 to its shared memory location 102 and instead of requesting an immediate interrupt it may write an indication to send an interrupt after a specified latency has elapsed. Generally speaking, the amount of time a sender 104 may wait is related to the importance or time-critical nature of the message 100, e.g., mission critical messages, or messages from high speed input/output devices may require short latency periods to ensure good throughput while less important or messages from slow I/O devices may have longer latency periods.

In some embodiments of the present disclosure the sender 104 may register with the privileged process 108 for deferred interrupts. In this example situation, the privileged process 108 may invoke one or more procedures for monitoring a trigger memory 118. In this example embodiment, when a trigger memory 118 is monitored by a privileged process 108, the privileged process 108 may poll, e.g., access the trigger memory 118 during a control switch and check whether a deferred interrupt has been set. In situations where the rate of control switches is too fast or too slow the privileged process 108 may adjust the polling frequency by, for example, checking the trigger memory 118 more or less often.

Figure 2:
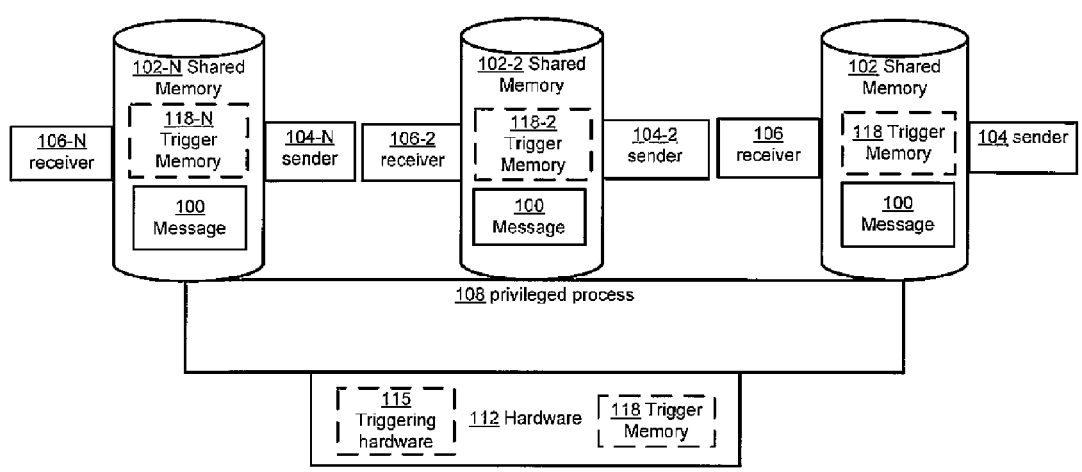
FIG. 2 illustrates an additional example system wherein aspects of the present disclosure may be implemented.

Referring now to FIG. 2, it illustrates an example operational embodiment that includes a plurality of shared memory locations 102 through 102-N where N is an integer greater than 1. As described above, a shared memory location 102, has a receiver 106 and a sender 104. As depicted by FIG. 2, each shared memory location 102 through 102-N can be associated with a privileged process 108 and hardware 112 such as one or more processors, and an optional triggering hardware component 115 that may include one or more hardware interrupt controllers. Generally speaking, the environment depicted by FIG. 2 operates similarly to that of FIG. 1, and is provided for one skilled in the art to appreciate that the operational procedures disclosed herein may be practiced in an environment that includes a plurality of shared memory locations, processors, etc.

Figure 3:
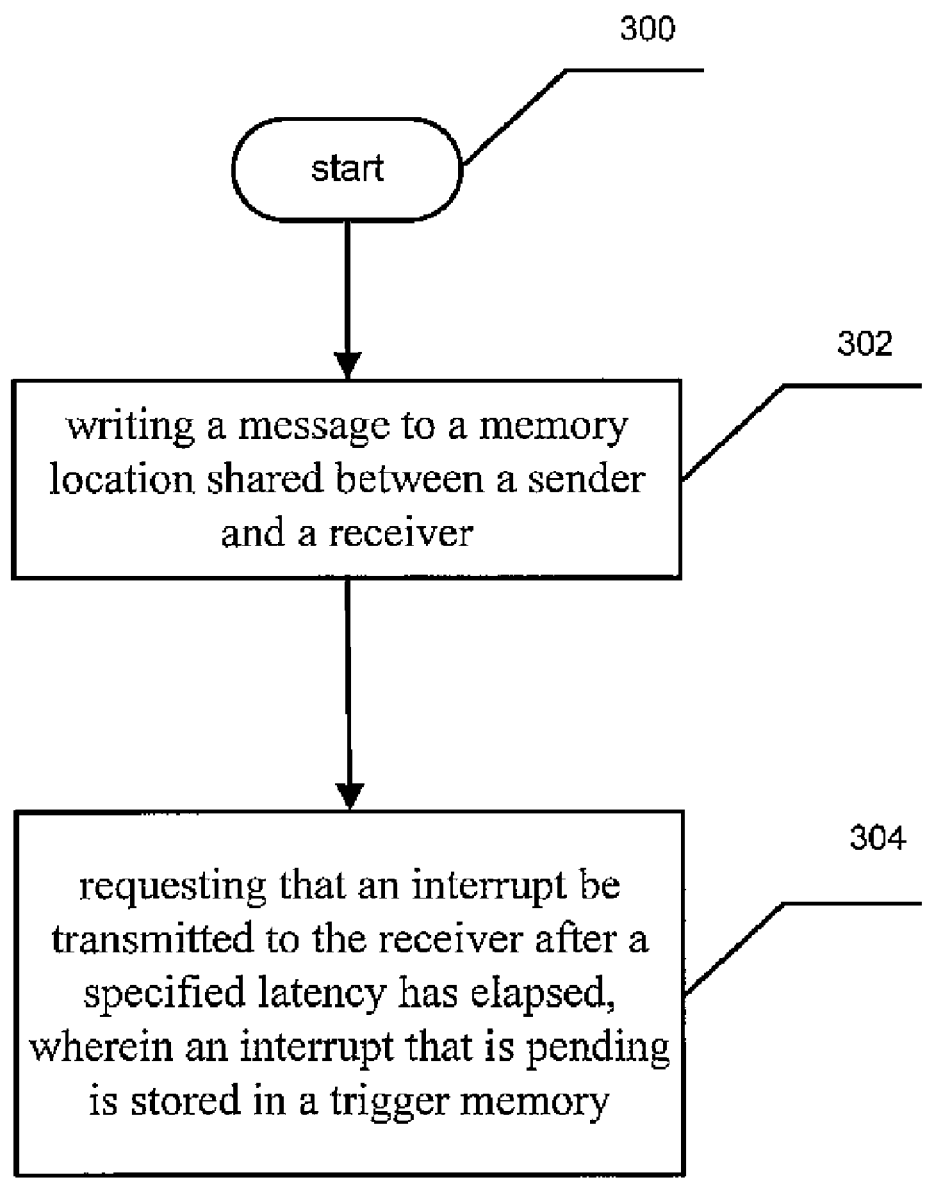
FIG. 3 illustrates an example operational procedure representing operations related to handling an asynchronous message sent over a channel.

Referring now to FIG. 3, it illustrates an example operational flow 300 that may be practiced within the system depicted in FIG. 1. or FIG. 2. FIG. 3 illustrates example operations related to sending a deferred interrupt that may include one or more of the operations 300, 302, and 304. Those skilled in the art will note that operations 300-304 are illustrative in purpose and that different implementations can typically employ one or more of the herein-described operations dependent upon context, and the selection of the appropriate operation(s) appropriate to the various context(s).

Operation 300 begins the operational process, and operation 302 depicts writing a message to a memory location shared between a sender and a receiver. Within an operational environment such as the one as depicted in FIG. 1 or FIG. 2, a sender 104 may write a message 100, e.g., a function invocation, a signal, and/or a data packet that contains information to a memory location 102 shared between a sender 104 and a receiver 106. In some example embodiments of the present disclosure, the shared memory 102 may include, but is not limited to, a ring buffer or any type of memory space where the addresses are reused by writing over a previously used location.

As depicted by FIG. 3, operation 304 illustrates requesting that an interrupt be transmitted to the receiver after a specified latency has elapsed, wherein an interrupt that is pending is stored in a trigger memory. For example, and in addition to the preceding example, in addition to writing the message 100 to shared memory 102, the sender 104 may request that an interrupt be transmitted to the receiver 106 after a specified latency has elapsed. In some embodiments, the sender 104 may request a deferred interrupt by writing a value to a trigger memory 118 indicative of a request for a deferred interrupt, or in another embodiment, the sender 104, can request a deferred interrupt by sending a signal to, for example, a triggering hardware component 115 requesting that the hardware component 115 set one or more bits of information indicative of a deferred interrupt in a trigger memory 118 coupled to it.

As stated above, once a trigger with a deferred interrupt has been written to the trigger memory 118, the triggering hardware component 115, for example, may transmit an interrupt to the associated receiver 106 after the deferred latency has elapsed. More specifically, when a trigger has been set in a trigger memory 118 coupled to, or part of, a hardware component 115, the component 115 can utilize a timing circuit to determine when the specified latency has elapsed, and in the event that the latency elapses, the hardware component 115 can send the interrupt to the receiver 106 directing it to process any message in the shared memory location 102.

FIG. 4 through FIG. 10 provide additional embodiments of the operation 300. One skilled in the art will recognize that the operational procedures illustrated in FIG. 4 through FIG. 10 are examples and other embodiments exist. Those skilled in the art will note that some operations in FIG. 4 through FIG. 10 are indicated by dashed lines, which in general, indicates that they are to be considered optional. More specifically, different implementations will typically employ one or more herein-described operations dependent upon context, and the selection of the appropriate operation(s) appropriate to the various context(s) is within the skill of one in the art in light of the teachings herein.

Figure 4:
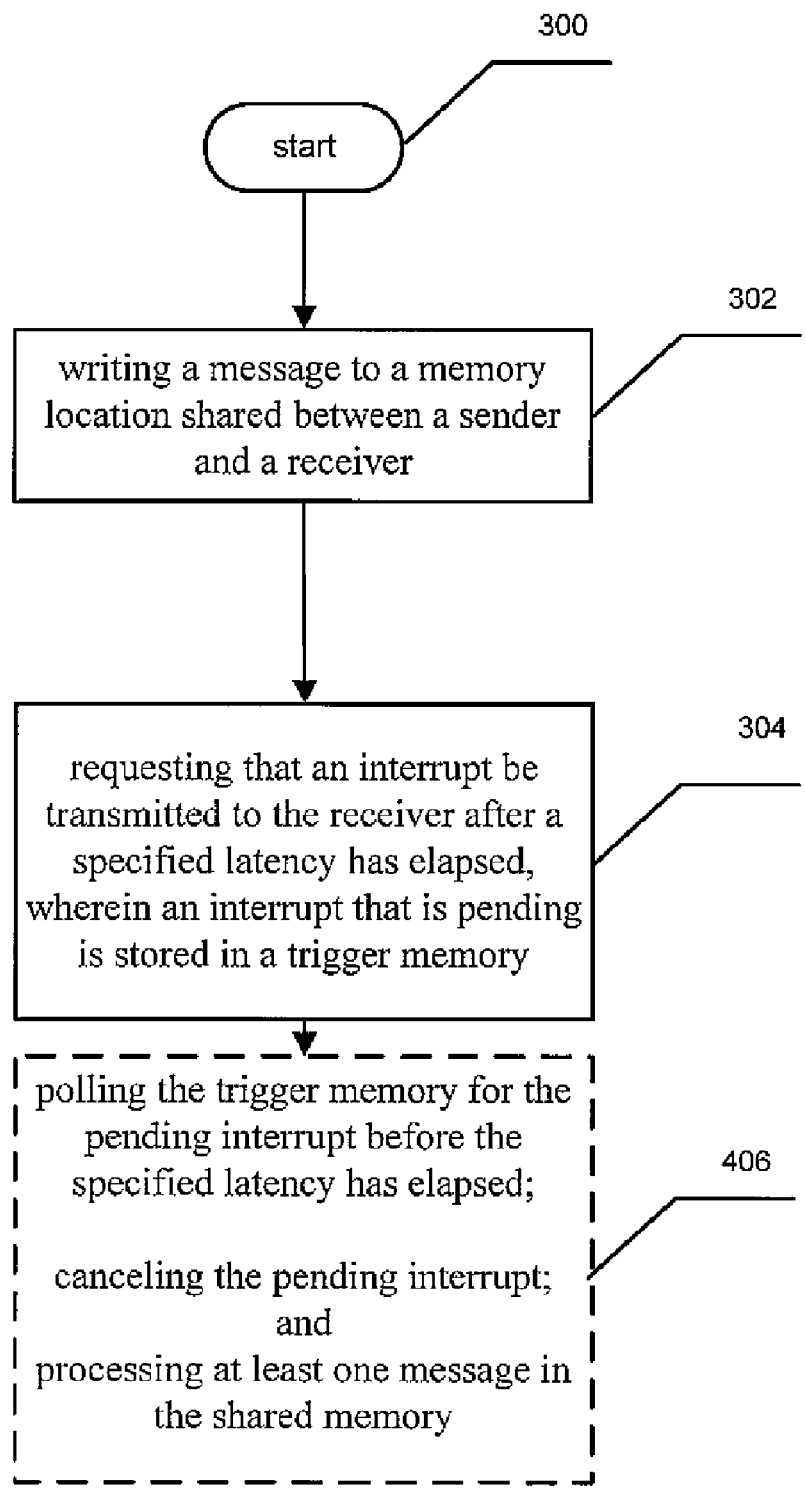
FIG. 4 illustrates an alternative embodiment of the example operational procedure of FIG. 3.

FIG. 4 illustrates an example of the operational procedure 300 including an additional operation. As depicted by operation 406 of FIG. 4, the operational procedure 300 may include polling the trigger memory for the pending interrupt before the specified latency has elapsed; canceling the pending interrupt; and processing at least one message in the shared memory. In at least one embodiment of the present disclosure, the receiver 106, can be configured to poll the trigger memory 118 optionally located within the shared memory location 102, or part of triggering hardware 115. In the instance that the trigger memory 118 contains a value, i.e., one or more bits indicative of a deferred interrupt, the receiver 106 may cancel the pending interrupt, and access the shared memory 102 to process the message 100.

Figure 5:
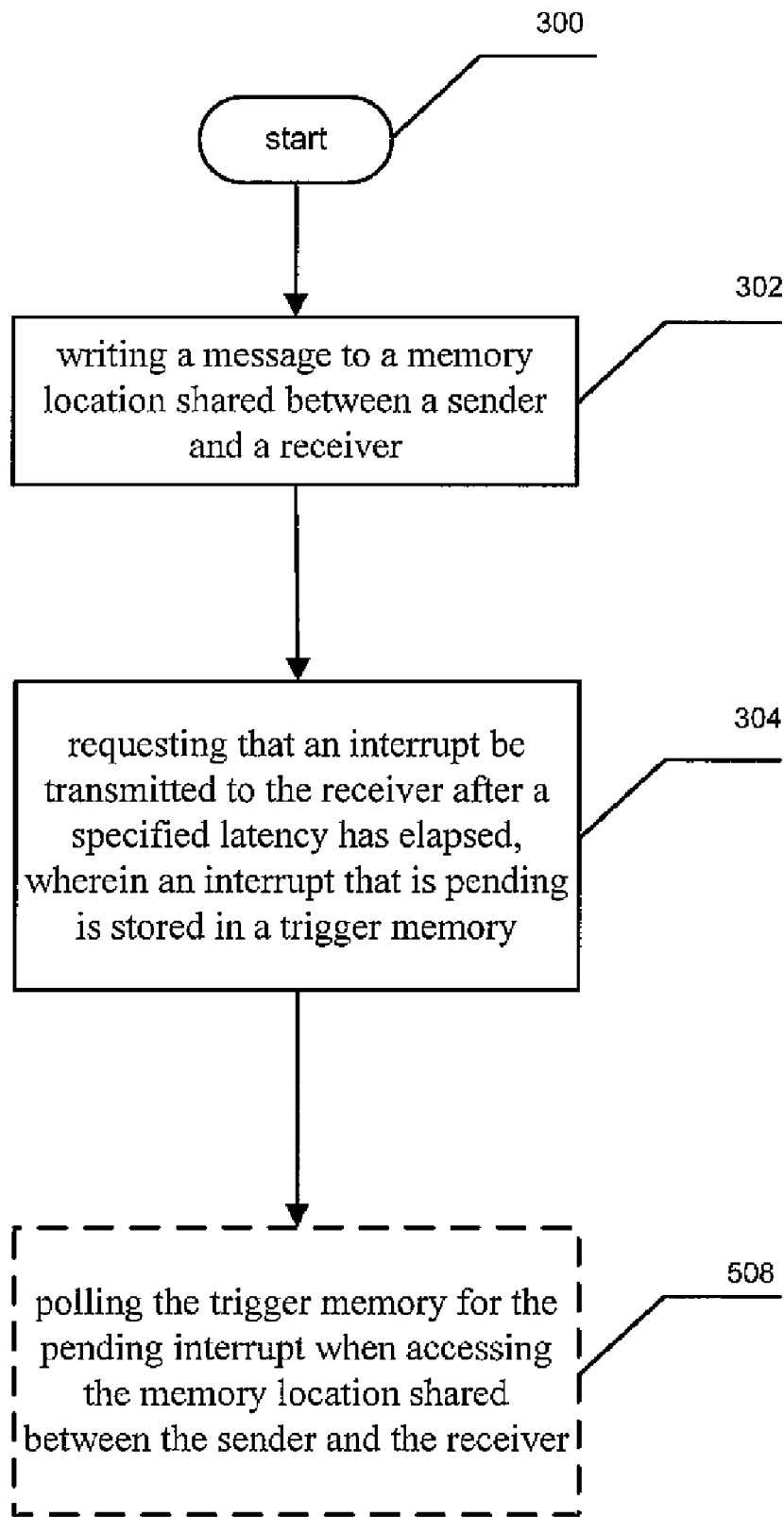
FIG. 5 illustrates an alternative embodiment of the example operational procedure of FIG. 3.

FIG. 5 illustrates the example operational flow 300 of FIG. 3 including an additional operation 508. Certain embodiments of the operational procedure 300 may additionally, or alternatively, include operation 508 that illustrates polling the trigger memory for the pending interrupt when accessing the memory location shared between the sender and the receiver. For example, systems that perform operation 508 may include a receiver 106, e.g., a process, or a virtual machine, that accesses a shared memory location 102, for example, when writing its own message and checks the trigger memory 118 to determine whether a sender 104 has previously requested deferred interrupt. In at least one example embodiment of the present disclosure, the receiver 106 may be able to poll the shared memory 102 for messages when writing its own because the rate that messages are sent between the two processes, or virtual machines, may be similar. By modifying the first and second processes, or machines, inter-partition/inter-process communication code to check the shared memory for messages with deferred interrupts the need for interrupts may be reduced.

In these, and other embodiments, the method or procedure used to access the shared memory 102, in order to obtain or send messages for example, i.e., the transport code, may be modified to check the trigger memory 118 for messages when writing a message or performing other naturally occurring operations. As stated above, for any given group of senders or receivers 104 and 106 with access to shared memory 102, there will undoubtedly be many transactions between the two and thus, the receiver 106 may have messages of its own to write into the shared memory 102 for the original sender 104, i.e., if a sender sends 20 messages to a receiver that has control over a I/O device, the receiver 106 will eventually send confirmation messages back to the sender 104, and completion messages when the I/O device finishes processing the request. More specifically, in some example situations that involve a virtual environment, a first virtual machine may send a message to a second virtual machine via a virtual machine bus. After the first virtual machine sends a message, the second machine may happen to send a message to the first machine (the message may be a message of its own, or a confirmation message related to the first message). In these cases, the code utilized to access the shared memory location can be modified to include a method or procedure to check the trigger memory 118 in order to determine whether a pending interrupt deferred by a latency exists.

An even more specific example may include a first process that can send a message 100 and request a deferred interrupt by writing one or more bits indicative of a deferred interrupt with a specified latency of 5 microseconds, for example. In this example, a second process may gain control of the computer hardware due to a control switch 1 microsecond later, or the second process may have access to its own CPU and may have just completed a task requested by the first process some time earlier. In this instance, the second process may invoke a write procedure to write a completion message to the first process indicating that the earlier task is complete. While the second process is writing the message 100 it may additionally poll the trigger memory 118. Since in this example only 1 microsecond has passed since the first process wrote the message with a specified latency of 5 microseconds, the second process may determine that a pending interrupt exists, and read the message from the shared memory 102 eliminating the need for an interrupt.

In at least one other embodiment, where the sender 104 has written a message 100 and the specified latency has not yet elapsed, the receiver 106, while polling, may invoke a method or procedure to clear the indication that a deferred interrupt is needed. In this example embodiment, the receiver 106 may defer reading the message 100 from the shared memory location 102 for an additional amount of time. More specifically, while the receiver 106 is obligated to read the message from the shared memory, in some embodiments, it may not read the message as soon as it is detected. In one example, the message 100 may be read from memory after an additional latency because the transport code that the receiver 106 utilizes to poll the shared memory location 102 may not include a procedure for reading messages. In this, and other example embodiments, a scheduler process may be invoked to schedule an operation to read the message from the shared memory 102 after the memory location is polled.

Figure 6:
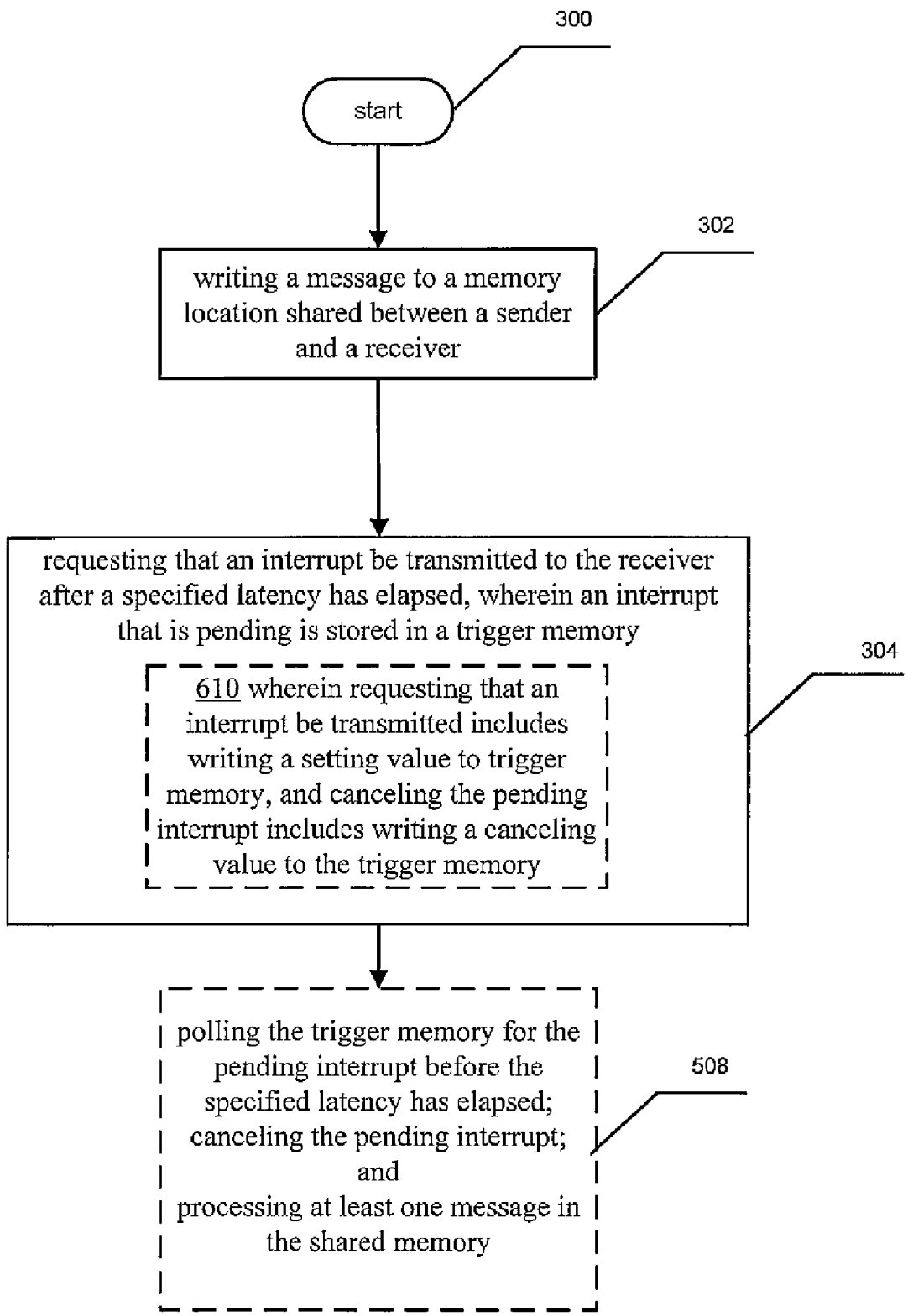
FIG. 6 illustrates an alternative embodiment of the example operational procedure of FIG. 5.

FIG. 6 illustrates the example operational flow 300 of FIG. 4 including an alternative operation including 610. In this example, writing a setting value to trigger memory, and canceling the pending interrupt includes writing a canceling value to the trigger memory is illustrated. In some instances of the present disclosure, the value in trigger memory 118 may be a true or false value, thus writing a value can include merely flipping the true value to a false. In other embodiments, setting a trigger in trigger memory 118 may include writing one or more bits of information, i.e., machine readable code that identifies to a method or procedure that an interrupt is pending. In other embodiments, the act of canceling may include erasing a bit that is indicative of the interrupt, or erasing a pointer to the bit, or writing an entirely new machine readable code indicative of the fact that an interrupt is not pending. One skilled in the art will appreciate that there are multiple ways of canceling values in memory and the present disclosure is not limited to any particular way and while some exemplarily techniques have been disclosed, the claims are not limited to any particular way of canceling a pending interrupt.

Figure 7:
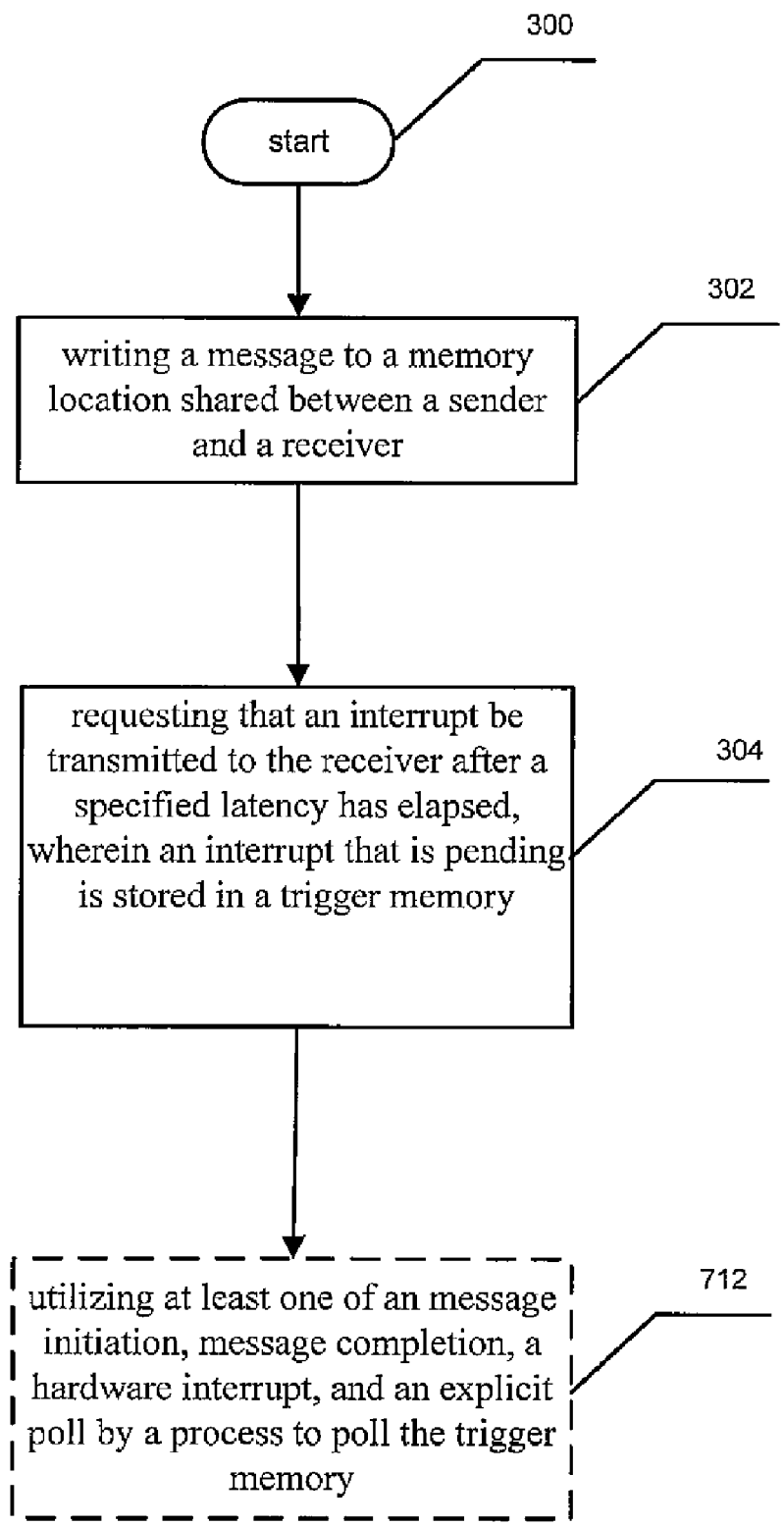
FIG. 7 illustrates an alternative embodiment of the example operational procedure of FIG. 3.

FIG. 7 illustrates the example operational flow 300 of FIG. 3 including an additional operation 712 that illustrates utilizing at least one of an message initiation, message completion, a hardware interrupt, and an explicit poll by a process when polling the trigger memory. For example, in some embodiments of the present disclosure that perform an operation similar to operation 712, the sender 104, i.e., a process or a virtual machine, may utilize one or more of a plurality of factors to poll the trigger memory. In one embodiment an application related signal can be used to poll the trigger memory 118. In these embodiments, an application, i.e., a computer program such as the software component of a web server may perform one or more operations, procedures, and/or loops that generates one or more signals related to input/output requests. In these cases, the application may submit these requests at semi-regular intervals and a method or procedure can be invoked to poll the trigger memory 118 while the application is submitting a request to an I/O device for example.

In another embodiment, the occurrence of an I/O related message can be utilized as a opportunistic time to poll the trigger memory 118. For example, in a system as depicted in FIG. 1, or FIG. 2, messages 100 may be passed back and forth between a sender 104 and a receiver 106 at a high rate. In some instances, these messages 100 may be associated with I/O devices such as hard drives, cd-rom drives, modems, etc. and the sender 104, or the receiver 106, may monitor the rate of interrupts sent by the I/O devices, and utilize the rate to drive the rate that the sender 104 and/or receiver 106 polls the trigger memory 118. In this example, the rate that I/O devices send interrupts can be leveraged by the processes or machines to check the trigger memory 118, i.e., if a process is already writing a message to a shared memory location 118, the execution of additional code to check a trigger memory 118 will be negligible.

In some instances of the present disclosure, the rate of interrupts sent by an I/O device may be leveraged to poll the trigger memory 118. For example, if a hardware interrupt occurs, and a process is directed to perform an action, the process may invoke a method to check the trigger memory 118 while it handling the interrupt.

Figure 8:
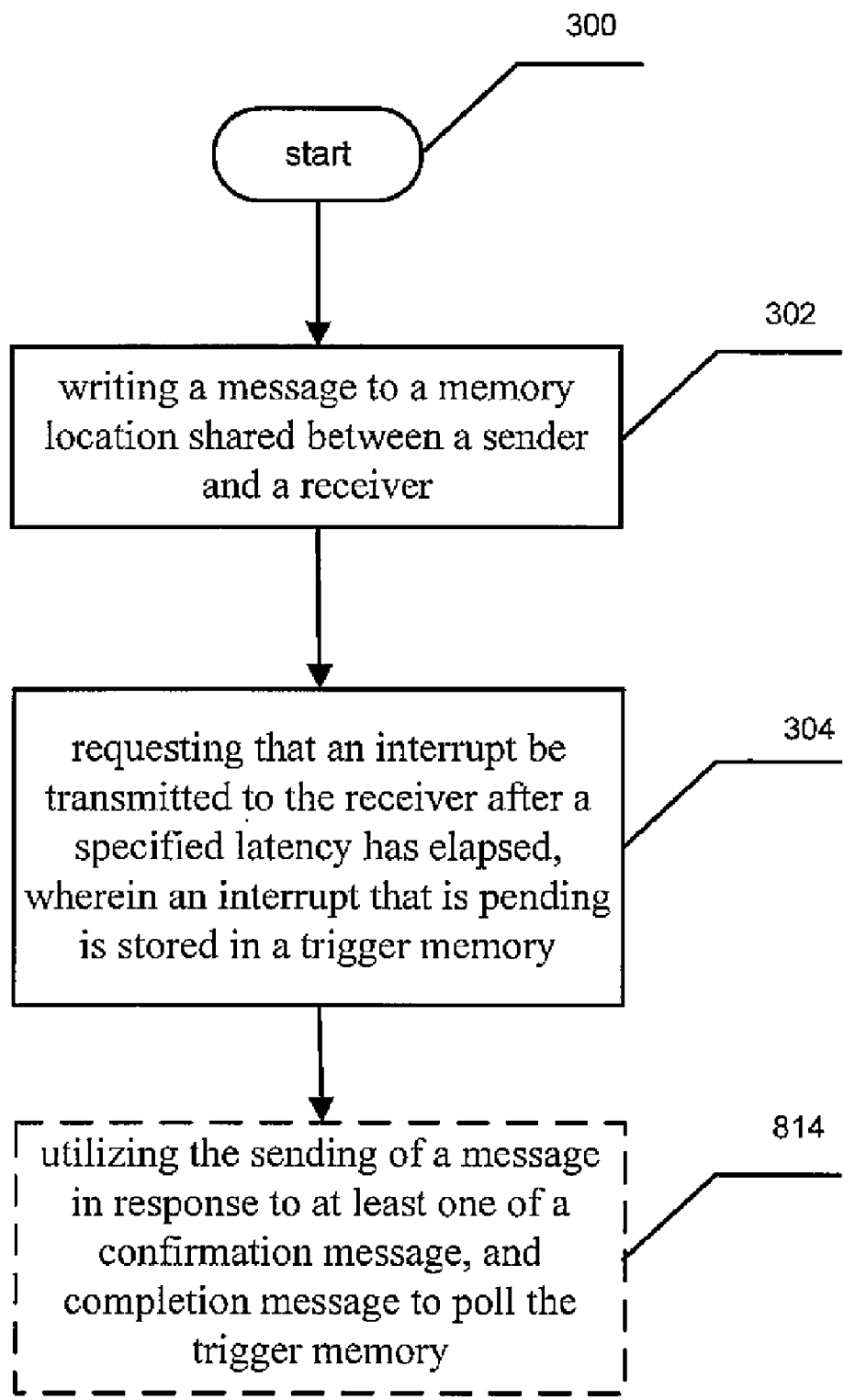
FIG. 8 illustrates an alternative embodiment of the example operational procedure of FIG. 3.

FIG. 8 illustrates an example operation 814 that depicts utilizing the sending of a message in response to at least one of a confirmation message, and completion message to poll the trigger memory. For example, in some embodiments of the present disclosure, the processes or virtual machines can utilize the nature of transaction based input/out requests when requesting deferred interrupts. Similar to that described above, multiple messages can be passed back and forth between a sender 104 and a receiver 106. As shown by the arrows associated with the sender 104 and the receiver 106, the sender 104, and receiver 106, may be sending multiple messages back and forth to each other. One skilled in the art will note that for each message 100 that the sender 104 sends there may be a confirmation, and a completion message sent back from the receiver 106. More specifically, one transaction may involve up to 3 messages (1 request, and/or 1 return confirmation message, and/or 1 completion message) sent between two processes or virtual machines, and in most instances each process or virtual machine will be the sender for one message and the receiver for the return confirmation and/or the completion message. Thus, in the situation where both the sender 104 and receiver 106 are asynchronously processing messages that are part of a transaction, both the sender 104 and receiver 106 will be, generally speaking, writing their own messages to the shared memory location 102 and expecting return messages.

The fact that at any given moment there will be multiple messages belonging to multiple transactions in the shared memory location 102 can be generally though of as the systems naturally occurring activity. This naturally occurring activity can be leveraged in multiple ways to reduce the need for interrupts. For example, in the event that both the sender 104 and receiver 106 are running, and interacting, with the shared memory location 102, a sender 104 can write a message 100 into shared memory 102 and request a deferred interrupt. Since the receiver 106 is interacting with the shared memory location 102 the receiver 106 may read the message from the shared memory 102 and clear the interrupt request from the trigger memory 118. In an example embodiment, the receiver 106 may clear the indication of a deferred interrupt by checking for it and processing any messages stored in shared memory 102, and in a multi-processor system, it may be cleared while both the sender 104 and receiver 106 are checking for messages of their own when processing messages stored in shared memory, i.e., processing a confirmation message, a completion message, or any other message.

Figure 9:
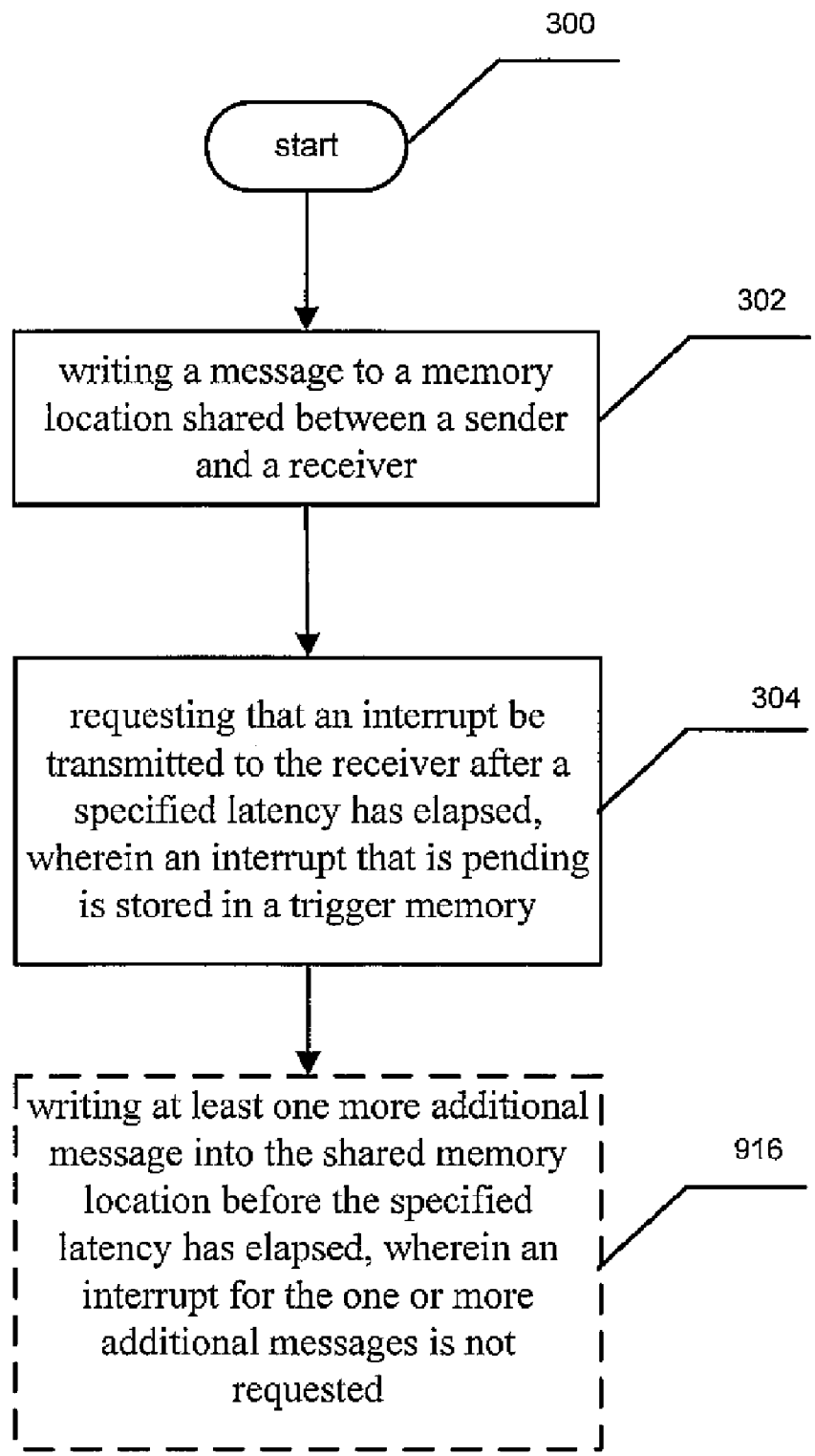
FIG. 9 illustrates an alternative embodiment of the example operational procedure of FIG. 3.

FIG. 9 illustrates the example operational flow 300 including an additional operation 916. Certain embodiments of the operational procedure 300 may additionally, or alternatively, include operation 916 that illustrates writing at least one more additional message into the shared memory location before the specified latency has elapsed, wherein an interrupt for the one or more additional messages is not requested. For example, in certain embodiments of the present disclosure, the sender 104 may write more than one message 100 to shared memory 102, and request a deferred interrupt for a group of messages. In this example operation, multiple messages may be written into a shared memory location and a single interrupt can be sent for the batch, because in some example systems, i.e., multi-processor systems and the like, the act of reading and processing a message from a shared memory location 102 is generally faster than initiating and writing a message. For example, in multiprocessor systems both the sender 104 and receiver 106 may be processing at the same time, if an interrupt is sent by the sender 104 when the message is written, the receiver 106 may read the message immediately. If the sender 104 writes another message 100, the receiver 106 will be interrupted again to read the new message. In instances where the interrupt associated with reading the memory is deferred, the sender 104 may "fill up" the shared memory location 102 before the interrupt is sent by only submitting a request for an interrupt for the first message for example written to shared memory. This opportunistically allows for systems practicing aspects of the present disclosure to group messages and allow for a receiver 106 to process multiple messages per interrupt taken.

More specifically, if the interrupt for the first message is sent immediately, the receiver 106 will start to process the first message soon after. Since it generally it takes less time to read a message than to write a message the shared memory location will almost always be empty, i.e., it is drained by the receiver 106 as soon as any message its written to it, especially if the system is a multi-processor system. In this example, the first message may be read by the receiver 106 before the second message has been fully written. Then, when the second message is finished being written the sender 104 may send another interrupt and the receiver will drain the shared memory again. If the interrupt is deferred utilizing aspects of the present disclosure, the sender may write, for example, multiple messages before an interrupt is send and the receiver starts processing.

Figure 10:
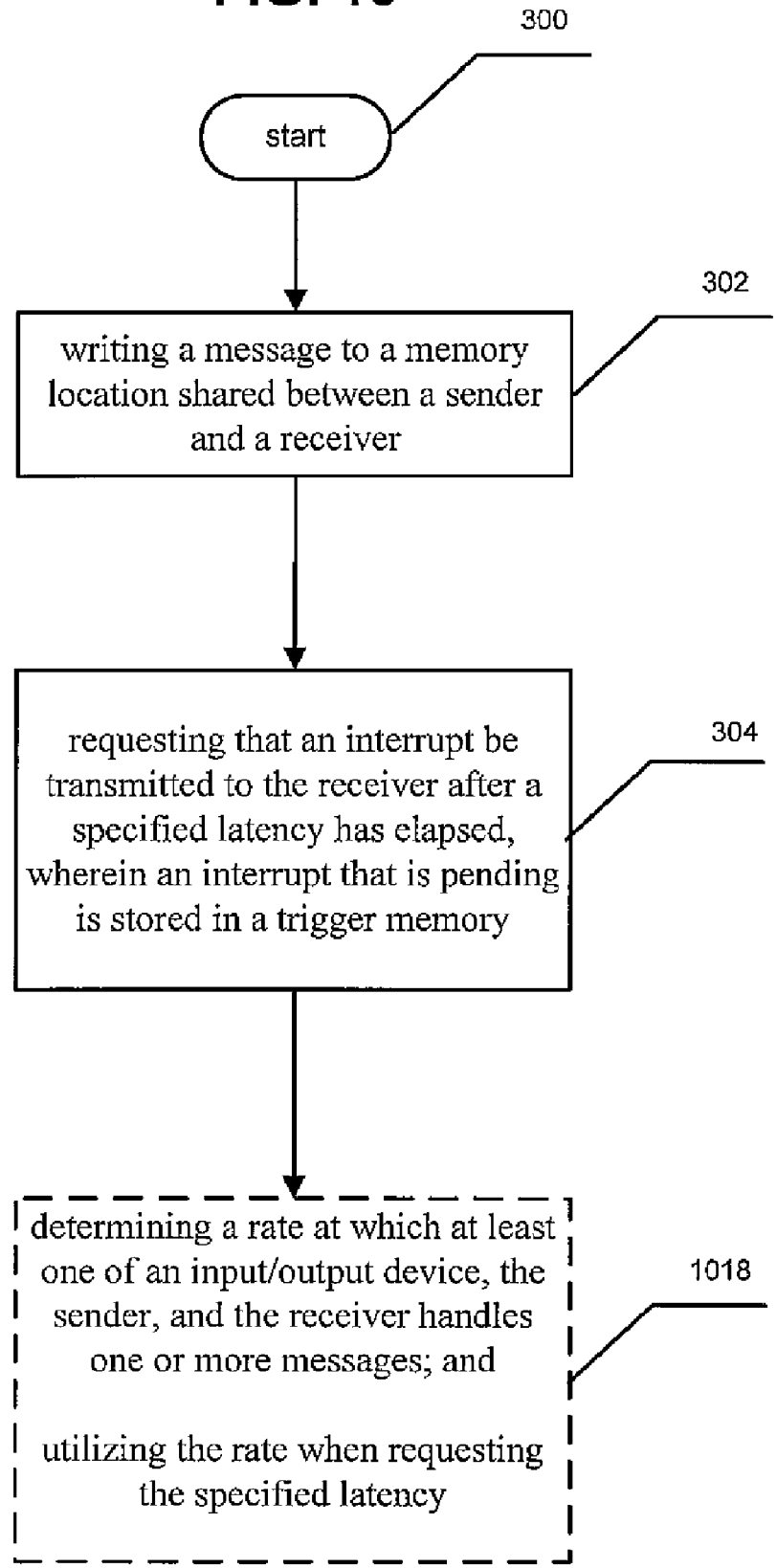
FIG. 10 illustrates an alternative embodiment of the example operational procedure of FIG. 3.

FIG. 10 illustrates the example operational flow 300 of FIG. 3 including an additional operation 1018. In certain embodiments of the present disclosure, the operational procedure 300 may additionally, or alternatively include operation 916 that illustrates determining a rate at which at least one of an input/output device, the sender, and the receiver handles one or more messages and utilizing the rate when requesting the specified latency. For example, in some embodiments of the present disclosure that perform an operation similar to operation 916, the sender 104, i.e., a process, a virtual machine, or in other embodiments a privileged process 108, may calculate the specified latency an interrupt may be deferred such that the performance of the computer system can be increased. For example, I/O devices, processes or virtual machines can only perform so many actions in a specific subset of time. If they are required to perform more actions then they can handle, there is no benefit in issuing further requests. In order to increase performance of the system, the rate that the I/O device, processes or virtual machines process messages can be determined, and utilized when requesting a specified latency. Thus, the flow of messages can be dynamically managed by utilizing deferred interrupts, i.e., if sender 104 has determined that a receiver 106 is already processing at maximum capacity, any message sent may not be processed for a long time so the sender 104 sets the specified latency to a length that will allow the receiver some time before having to process the message.

Figure 11:
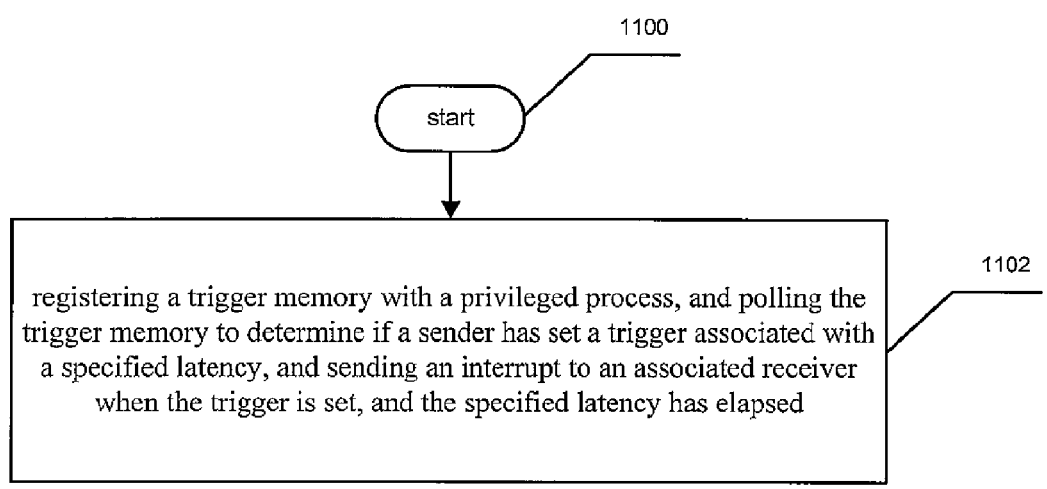
FIG. 11 illustrates an example operational procedure representing operations related to sending an interrupt deferred for a specified latency.

FIG. 11 depicts operations related to sending a deferred interrupt including operations 1100, and 1102 that may be embodied within an operational environment such as one depicted in FIG. 1 or FIG. 2. Those skilled in the art will appreciate that operations 1100-1102 are illustrative in purpose and different implementations can typically employ one or more of the herein-described operations dependent upon context, and the selection of the appropriate operation(s) appropriate to the various context(s).

As depicted in FIG. 11 operation 1100 begins the operational procedure and operation 1102 illustrates registering a trigger memory with a privileged process, and polling the trigger memory to determine if a sender has set a trigger associated with a specified latency, and sending an interrupt to an associated receiver when the trigger is set, and the specified latency has elapsed. Operation 1102 may be performed in a system similar to that of the system depicted in FIG. 1 or FIG. 2. For example, and referring to the example system of FIG. 2, operation 1102 illustrates a privileged process 108 that registers a trigger memory 118 that is optionally located in the shared memory location 102, or coupled to triggering hardware 115, as a trigger memory 118 to monitor, and subsequently polls the trigger memory 118. In example embodiments that perform operation 1102, the privileged process 108 may check to see if a sender 104 associated with that shared memory location 102 has set one or more bits of information indicative of a deferred interrupt in a trigger memory 118 allocated to store triggers. In some embodiments, a trigger may indicate the time the trigger was entered into the trigger memory 118 and the specified amount of time that may elapse before an interrupt is needed. In the situation where a trigger has been written to trigger memory 118, and the specified latency has elapsed, the privileged process 108, or a hardware trigger component 115, may send an interrupt to the associated receiver directing the receiver to read the shared memory 102, and process the message 100.

FIG. 12 through FIG. 19 provide additional embodiments of the operation 1100. One skilled in the art will recognize that the operational steps illustrated in FIG. 12 through FIG. 19 are examples and other embodiments exist.

Figure 12:
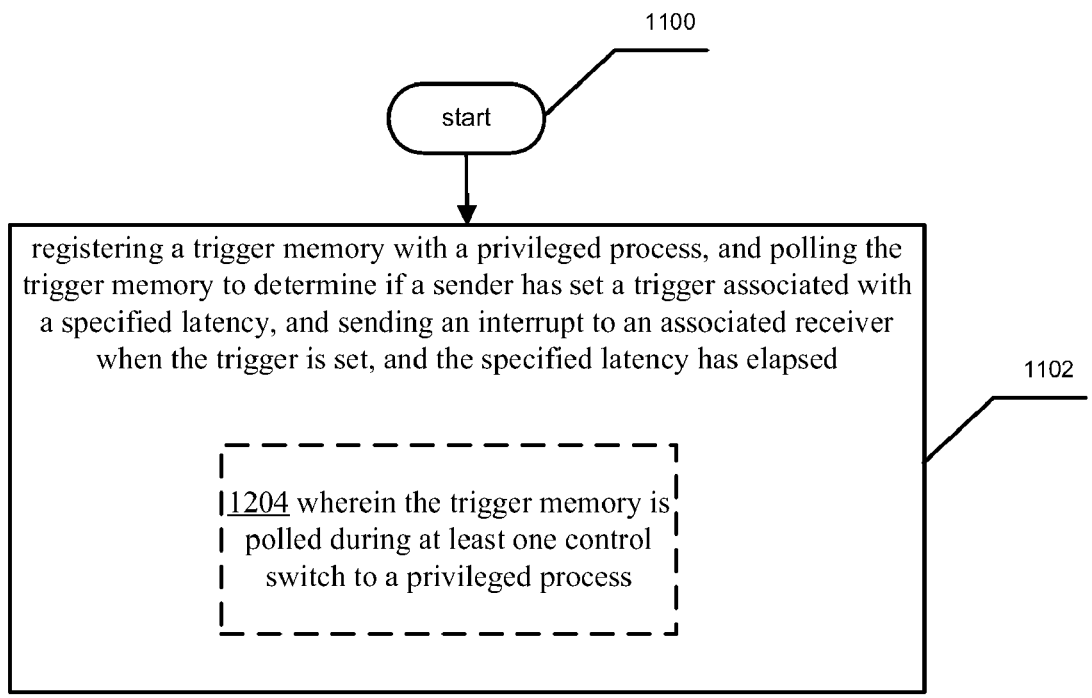
FIG. 12 illustrates an alternative embodiment of the example operational procedure of FIG. 11.

As depicted by 1204 of FIG. 12, the polling operation described above may in some embodiments of the present disclosure, occur during at least one control switch to a privileged process. As stated above, a privileged process 108 may access a trigger memory 108 and check if there are any deferred interrupts pending. In some embodiments of the present disclosure, this may occur when the privileged process 108 gains control of the hardware 112 and polls the trigger memory 118 during, for example, an exception that traps into the kernel, or more generally, when the CPU happens to be running code in the kernel, or VMM. In one embodiment of the operational procedure depicted in FIG. 11, the privileged process 108 may poll the shared memory 102 during such a control switch. More specifically, since control switches to a privileged process 108 happen at least semi-regularly, additional code may be added to the privileged process 108 to have it access the trigger memory 118 and read the bits to check to see if a sender 104 has set a deferred interrupt.

Figure 13:
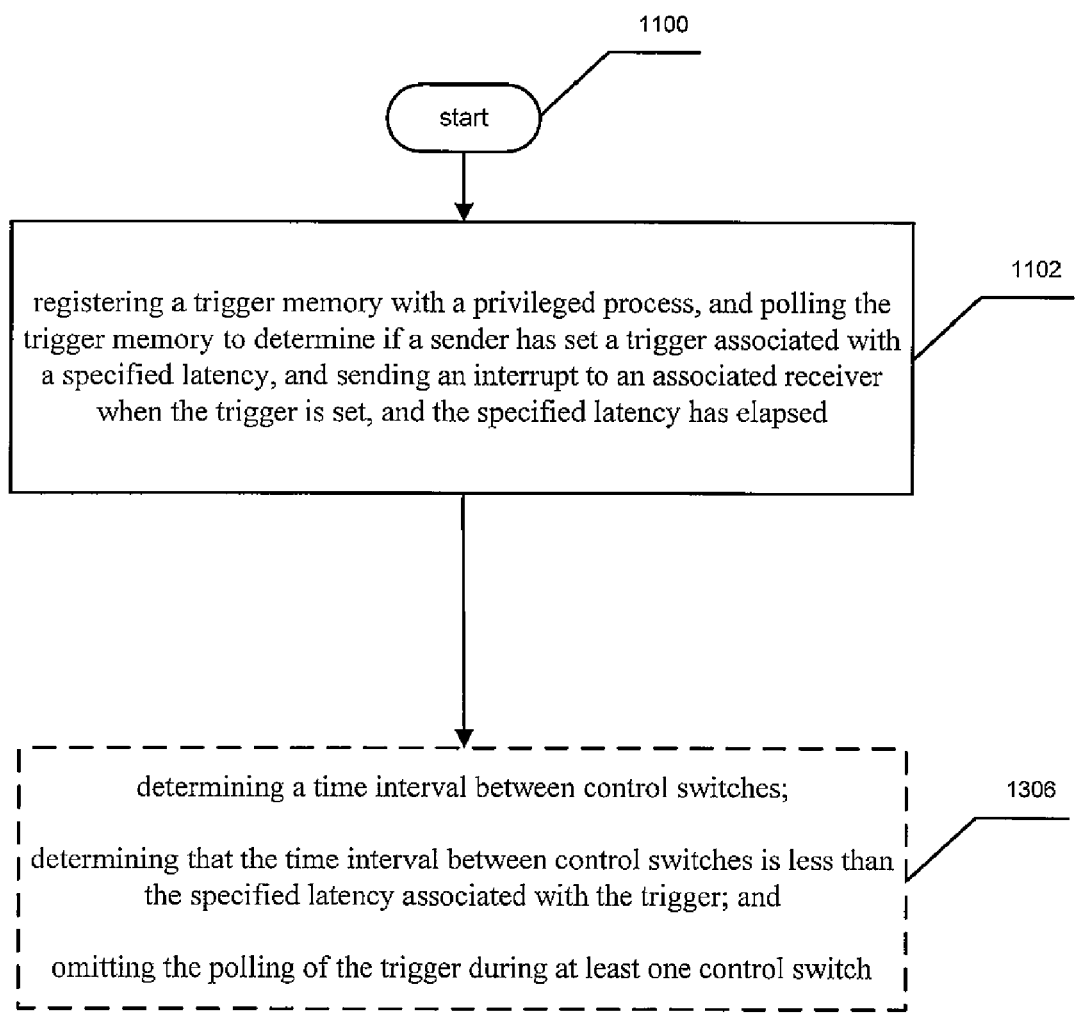
FIG. 13 illustrates an alternative embodiment of the example operational procedure of FIG. 11.

FIG. 13 depicts the example operational flow 1100 of FIG. 11 including the additional optional operations 1306 that illustrates determining a time interval between control switches; determining that the time interval between control switches is less than the specified latency associated with the trigger; and omitting the polling of the trigger during at least one control switch. For example, in operating environments such as those depicted in FIG. 1 or FIG. 2, a privileged process 108 may calculate the time in between control switches and poll one or more trigger memory locations 118-118-N, for example. During these control switches, the privileged process 108 may determine that deferred interrupts have been periodically requested by a specific sender 104, and that the latencies associated with each message 100 are generally the same each time the sender requests an interrupt. In this situation, the privileged process 108 may determine that the time interval in between control switches is less than the average amount of time the specific sender 104 generally specifies in the trigger for a deferred interrupt. In this instance, the privileged process 108 may omit the polling of this trigger memory 118, or omit the polling of a specific trigger in the trigger memory 118, during one or more control switches, because on average, the privileged process 108 has determined via a determining operation, or method, that there likely will be at least one more control switch before the interrupt needs to be sent.

A specific example of operation 1306 may include a privileged process 108, e.g., a kernel, or virtual machine manager, that determines that a control switch occurs every 2 microseconds. In this example, the privileged process 108 may have polled a specific shared trigger memory 102 for the last 5 minutes during every control switch, and the privileged process 108 may have determined that the average latency requested in a deferred interrupt request is 8 microseconds. The privileged process 108 (determining via a calculating method or procedure) may determine that on average the sender 104 sets 8 microseconds as the deferred time for an interrupt and can skip a polling operation of at least one trigger during at least one control switch so that, for example, the privileged process 108 polls the trigger memory 118, or at least one trigger in the trigger memory 118, every third control switch (every 6 microseconds in this example). In this example situation, since the requested latency is on average 8 microseconds a privileged process 108 that is polling every third control switch will still check the trigger before the interrupt needs to be sent.

Figure 14:
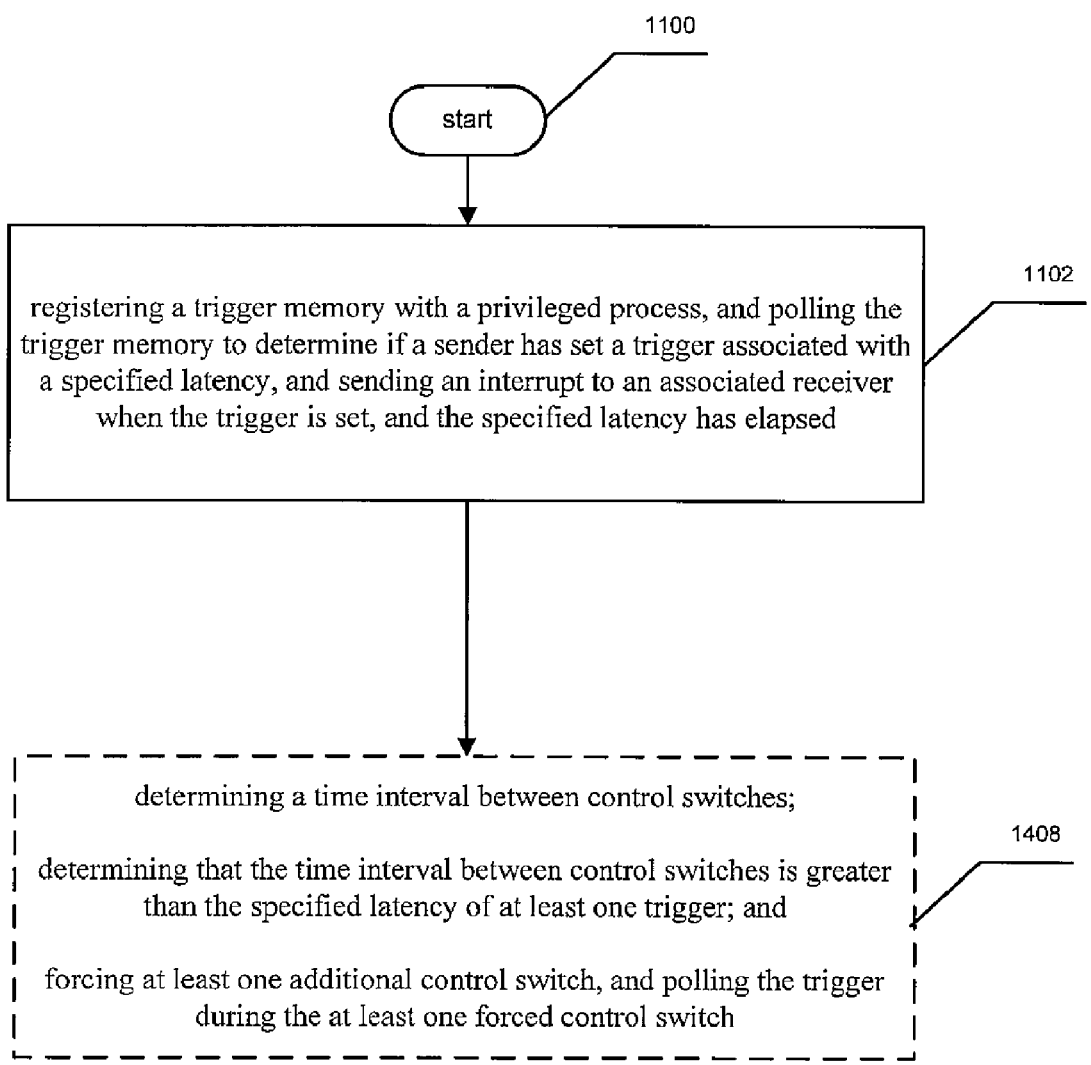
FIG. 14 illustrates an alternative embodiment of the example operational procedure of FIG. 11.

FIG. 14 depicts the example operational flow 1100 of FIG. 11 including the additional optional operation 1408 that illustrates determining a time interval between control switches; determining that the time interval between control switches is greater than the specified latency of at least one trigger; and forcing at least one additional control switch, and polling the trigger during the at least one forced control switch. For example, in operating environments such as those depicted in FIG. 1 or FIG. 2, a privileged process 108 may determine via a determining method or algorithm the time interval in between control switches while polling one or more triggers stored in trigger memory 118, i.e., a memory structure that is configured to store one or more bits indicative of a deferred interrupt that can be optionally located in the shared memory location 102, or in other embodiments, can be coupled to hardware configured to send interrupts 115, or the privileged process 108. In some example situations, the privileged process 108 may determine that the time in between control switches is greater than the amount of time a specific sender 104 usually specifies as the amount of time that can elapse before an interrupt is needed. In situations such as this where the specified latency will elapse before a control switch to a privileged process 108 occurs, the privileged process 108 may utilize a procedure, or method, that forces at least one additional control switch to the privileged process 108 and requires that the privileged process poll the memory location 102 during the forced control switch.

A specific example of operation 1408 may include the kernel of an operating system running a calculating routine to calculate the time from when it releases control of the hardware to a process until it regains control. The calculated time, for example, may then be compared against the average latency that a sending process specifies as the time an interrupt may be deferred. In the instance that the specified latency is short and a control switch to the kernel will not generally occur before the time elapses, a routine may force a control switch to the kernel in order to have it poll the shared memory location 102, or in at least one additional embodiment, the kernel may set a hardware timer in the triggering hardware 115 directing the hardware to fire an interrupt before the time elapses to ensure that the privileged process gains control.

Figure 15:
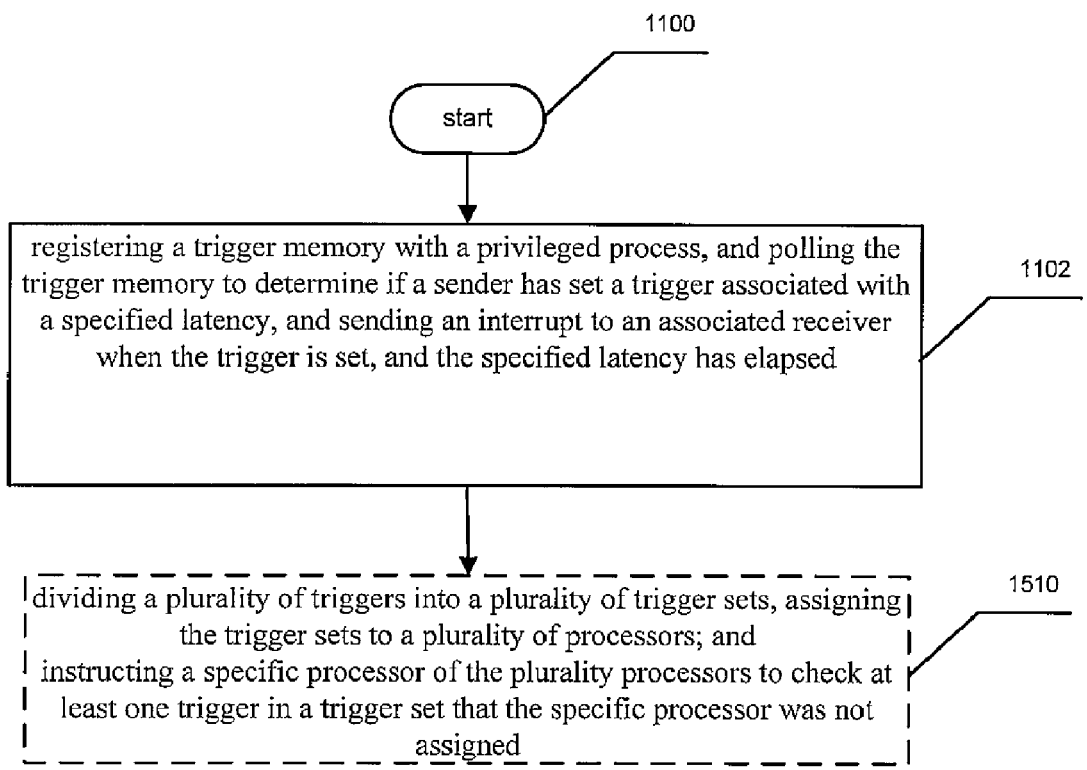
FIG. 15 illustrates an alternative embodiment of the example operational procedure of FIG. 11.

FIG. 15 depicts the example operational flow 1100 of FIG. 11 including the additional optional operation 1510 that depicts dividing a plurality of triggers into a plurality of trigger sets, assigning each trigger set to one of a plurality of processors; and instructing a specific processor of the plurality processors to check at least one trigger in a trigger set that the specific processor was not assigned. In some example instances, i.e., in scaled systems, the system may include a plurality of processors monitoring the triggers associated with a plurality of senders and receivers. In situations such as this, the plurality of triggers in the trigger memories 118-118-N may be divided up into groups of trigger sets. For example, FIG. 2 depicts privileged process 108 managing shared memory 102 through 102-N, thus a set may include some or all of the triggers in a trigger memory 118. In this, and other, example embodiments, hardware 112 may include multiple processors and each processor may be assigned a group of triggers to monitor. Once the sets have been assigned, a processor may be configured to poll a shared memory location that it were not assigned.

This configuration ensures that messages 100 in a shared memory location 102 will not sit in the location past the specified latency because more than one processor is checking a given trigger, and in the instance that a specific processor is halted (no longer checking triggers) the triggers can still be monitored. The procedure for checking triggers outside of an assigned group may utilize a randomizing element that allows for randomly polling another processor's set, or an algorithm may be used to identify high priority triggers that have short specified latencies. One skilled in the art will appreciate that there are may techniques for checking subsets within a set and the invention is not limited by any particular technique for doing so.

Figure 16:
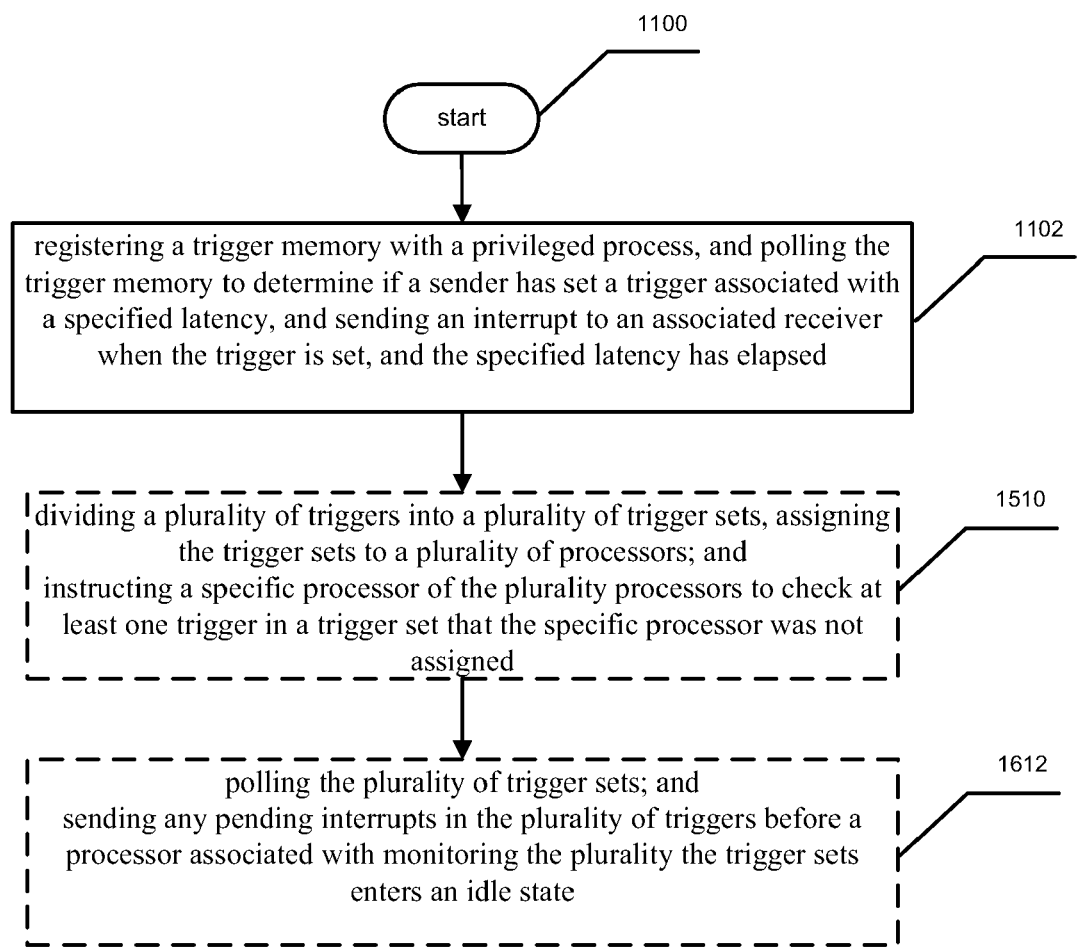
FIG. 16 illustrates an alternative embodiment of the example operational procedure of FIG. 15.

FIG. 16 depicts the example operational flow 1100 of FIG. 15 including the additional optional operation 1612 that illustrates polling the plurality of trigger sets; and sending any pending interrupts in the plurality of triggers before a processor associated with monitoring the plurality the trigger sets enters an idle state. For example, in some example situations a privileged process 108 may be monitoring one or more shared memory locations 102 through 102-N and the processor may enter an idle state, i.e., the CPU in the hardware 112 may enter a state where it performs no work by receiving, for example, a halt instruction, or the processor may enter a halt state when the kernel's scheduler determines that there are no more additional threads to be run. In the instance where the shared memory location 102 has been polled and the privileged process 108 is aware of one or more messages 100 in a shared memory location 102 that have that have a deferred interrupt pending in trigger memory 118, the privileged process 108 may send the interrupts regardless of whether the specified latency has elapsed before the processor associated with the privileged process 108 enters a idle state.

Figure 17:
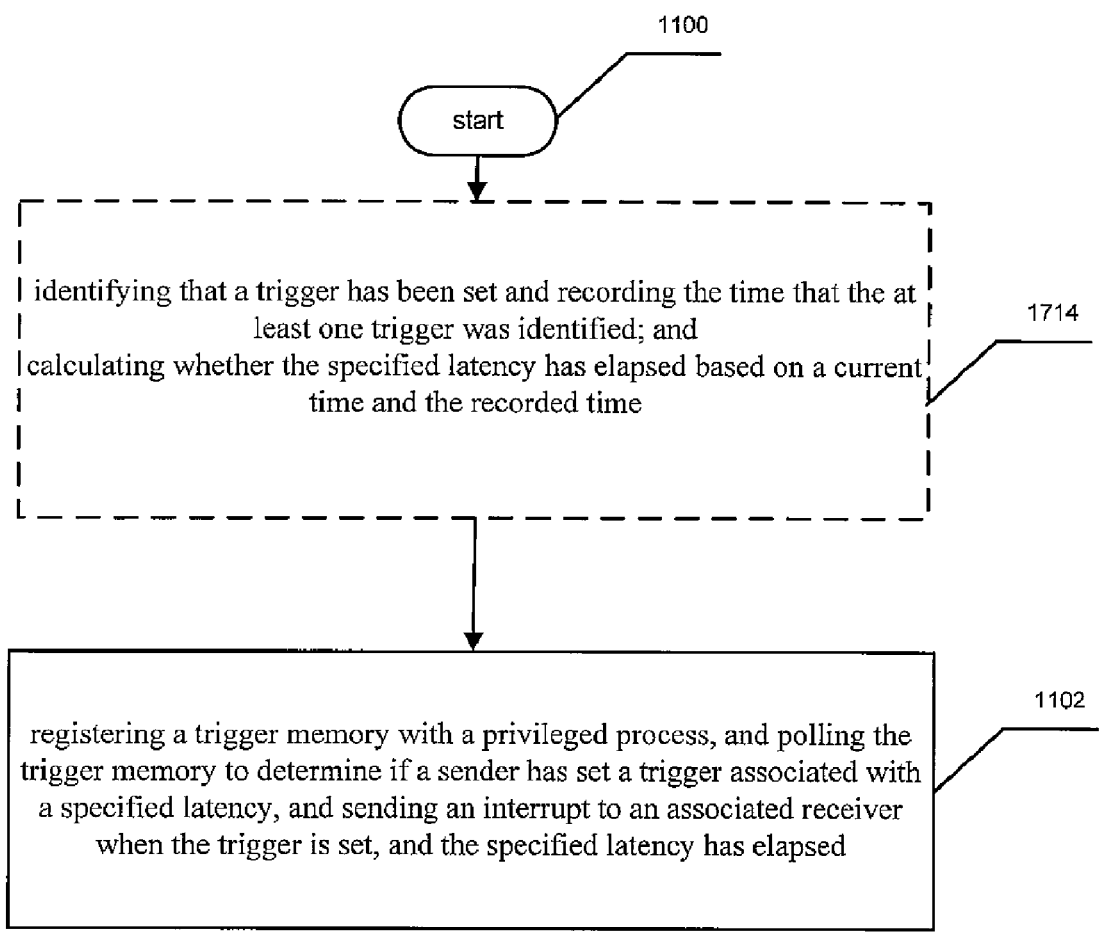
FIG. 17 illustrates an alternative embodiment of the example operational procedure of FIG. 11.

FIG. 17 depicts the example operational flow 1100 of FIG. 11 including the additional optional operation 1714 that depicts identifying that a trigger has been set and recording the time that the at least one trigger was identified; and calculating whether the specified latency has elapsed based on a current time and the recorded time. For example, a privilege process 108 may poll, i.e., check the trigger memory 118. In some example situations, the privileged process 108 may identify that a trigger, e.g., one or more bits, was set and run a routine that sets the point that the bits were identified as a starting point for determining whether the specified latency has elapsed. The privileged process 108 may release control of the hardware 112 and may then regain control during a control switch later on for example. The privileged process 108 may then poll the one or more bits again to check whether the trigger associated with a message 100 is still set (for example, during the control switch the associated receiver 106 may have read the message 100, and cleared the trigger). In the event that the trigger is still set, the privileged process 108 may calculate whether the specified time has elapsed by comparing the current time to the time set as the starting point during the earlier control switch.

Figure 18:
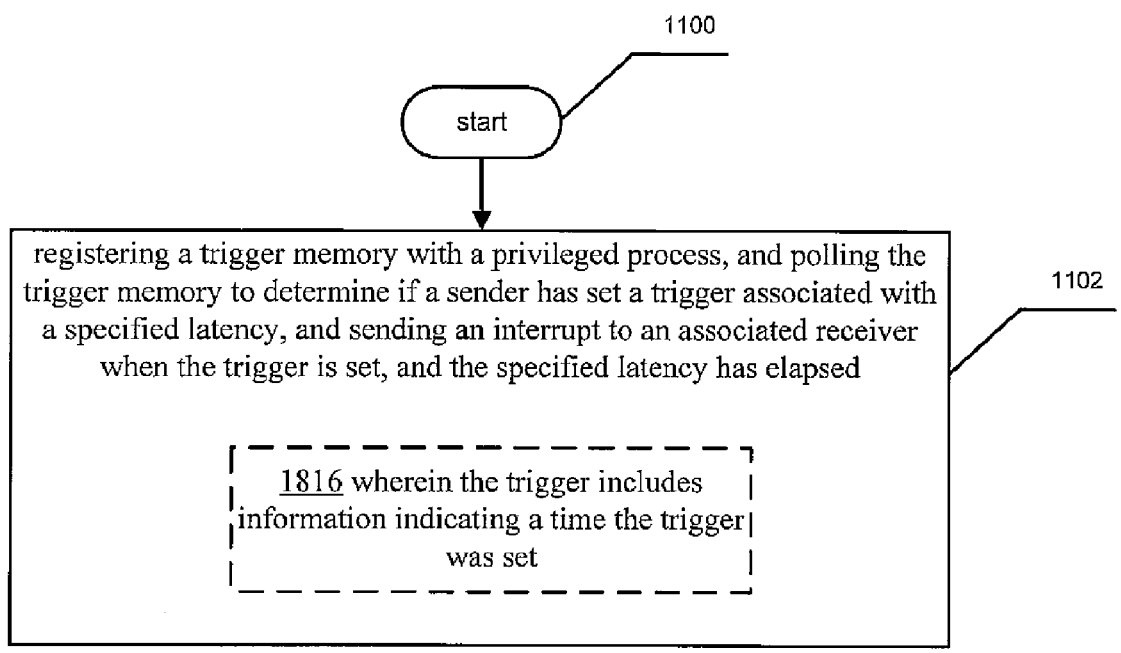
FIG. 18 illustrates an alternative embodiment of the example operational procedure of FIG. 11.

FIG. 18 depicts the example operational flow 1100 of FIG. 11 including 1816. As depicted by FIG. 18, the trigger, e.g., one or more bits indicative of a deferred interrupt may include information that indicates the time the one or more bits were set. For example, in some instances a set trigger in trigger memory 118 may contain information about a message 100 that may have be written into the shared memory 102 by a sender 104. The information may be include, but is not limited to, the time that the message 100 was written into the shared memory 102.

Figure 19:
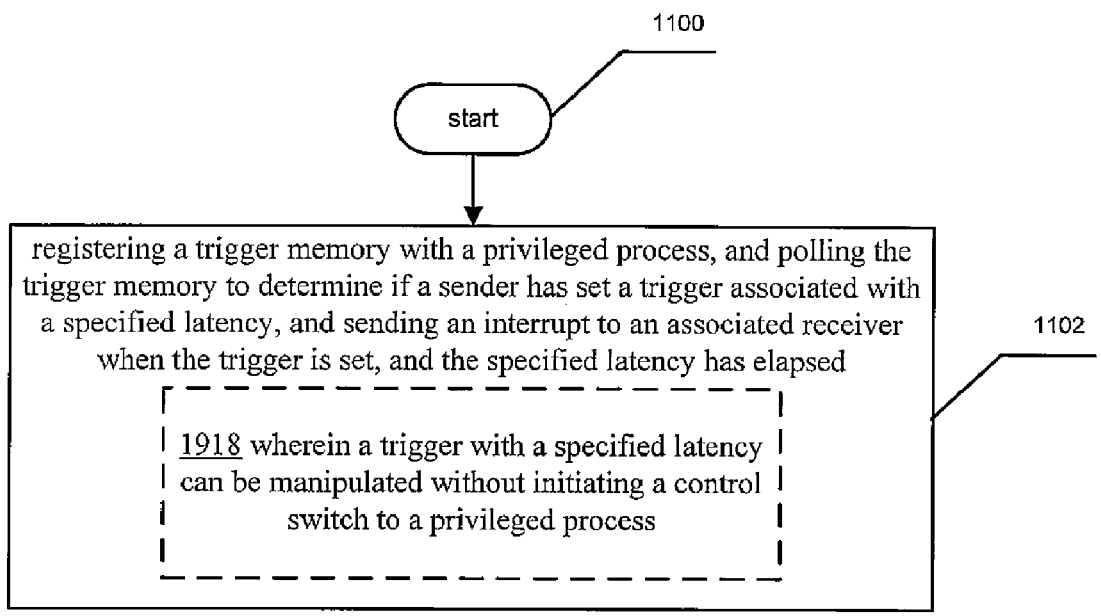
FIG. 19 illustrates an alternative embodiment of the example operational procedure of FIG. 11.

FIG. 19 illustrates an example embodiment of the operational procedure of 1100 including 1918, that illustrates that a trigger with a specified latency can be manipulated without initiating a control switch to a privileged process. For example, in some instances of the present disclosure, a process or machine, i.e., a sender 104 or receiver 106 may manipulate, i.e., set or cancel, the trigger stored in trigger memory 118 without a control switch to a privileged process occurring. For example, a send 104 can request an interrupt, i.e., by setting one or more bits of information indicative of a deferred interrupt stored in trigger memory 118 optionally located in the shared memory location 102, or in RAM of hardware 112. In this example, the sender 104 may invoke a method or procedure to request the deferred interrupt without requiring a control switch to a privileged process 108, i.e., the sender 104 itself can request the deferred interrupt without utilizing features provided by the privileged process 108. Similarly, a receiver 106 can additionally modify the trigger during, for example, when it is processing other work, or writing its own message to a shared memory location 102.

Figure 20:
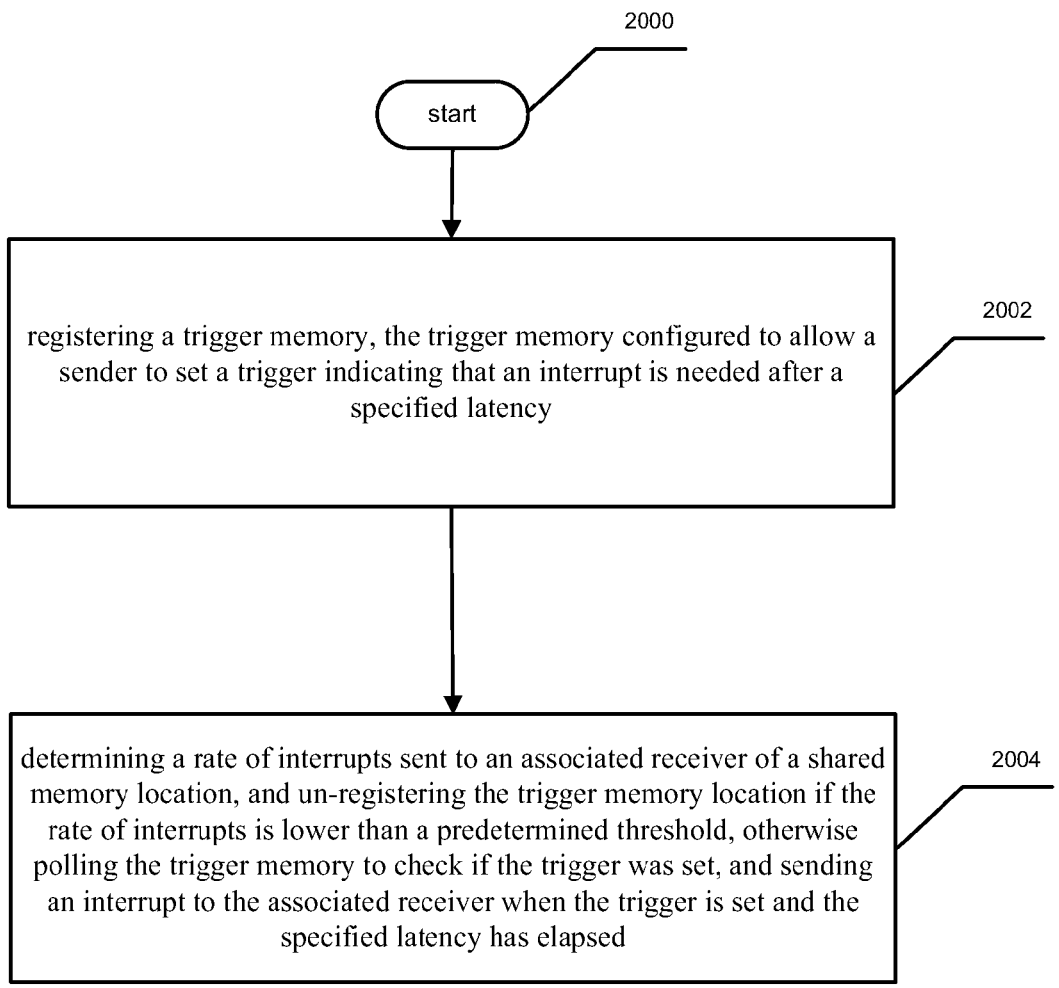
FIG. 20 illustrates an example operational procedure representing operations related to sending a deferred interrupt to a process.

FIG. 20 illustrates the operational flow 2000 representing example operations relating sending a deferred interrupt that optionally may include one or more of the operations 2000, 2002, and 2004. As depicted by FIG. 20, the operational procedure begins with operation 2000. Operation 2002 illustrates registering a trigger memory, the trigger memory configured to allow a sender to set a trigger indicating that an interrupt is needed after a specified latency. For example, a privileged process 108, i.e., a kernel of an operating system or a virtual machine monitor may monitor a trigger memory by registering the trigger memory 118 as a location to poll.

As depicted by FIG. 20, the operational procedure 2000 includes operation 2004 that illustrates determining a rate of interrupts sent to an associated receiver of a shared memory location, and un-registering the trigger memory location if the rate of interrupts is lower than a predetermined threshold, otherwise polling the trigger memory to check if the trigger was set, and sending an interrupt to the associated receiver when the trigger is set and the specified latency has elapsed. For example, a routine or method performed by the privileged process 108, the sender 104, and/or the receiver may count how many times it has sent interrupts for a specific sender 104 associated with a specific shared memory location 102 in a specified time frame. In the event that interrupts are infrequently given, either because the trigger is cleared by the receiver 106, or the rate of message passing between the sender 104 and receiver 106 is significantly low, the privileged process 108 may unregistered memory location by clearing, for example, the trigger memory location 118 and notifying the sender 104 and/or the receiver 106 that it will not poll the shared memory location 102 until, for example, it receives another request to monitor the shared memory location 102. In the instance where the amount of messages is significant the privileged process 108 may poll the shared memory location 102 during a control switch, for example.

One skilled in the art will appreciate that the amount of interrupts over a time frame that are required to invoke a procedure that changes the system from a poll oriented process to a push oriented process and vice versa depends on the context in which the operational procedure is performed and the requirements of the system. For example, in some example systems the electrical circuitry and software may be adversely impacted by an amount of polling that has a negligible performance impact on a different combination of electrical circuitry and software and thus, the present disclosure is not limited to any particular ratio of interrupts per time frame before switching from one process to the other.

Figure 21:
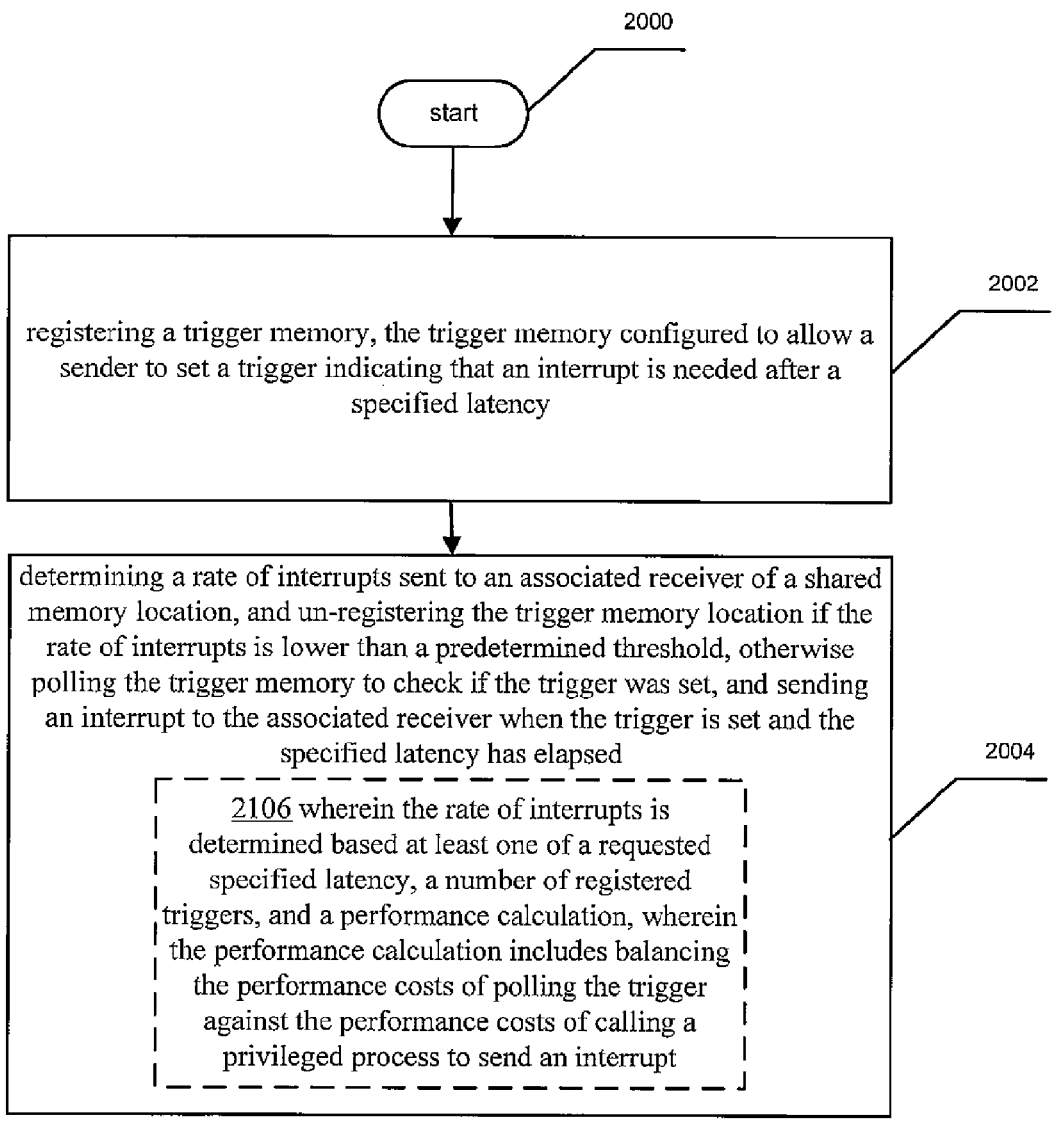
FIG. 21 illustrates an alternative embodiment of the example operational procedure of FIG. 20.

FIG. 21 through FIG. 22 provide additional embodiments of the operation procedure 2000. One skilled in the art will recognize that the operational steps illustrated in FIG. 21 and FIG. 22 are examples and other embodiments exist.

FIG. 21 illustrates an example embodiment of the operational flow 2000 that includes 2106 that illustrates an embodiment where the rate of interrupts is determined based on least one of a requested specified latency, a number of registered triggers, and a performance calculation, and the performance calculation includes balancing the performance costs of polling the trigger against the performance costs of calling a privileged process to send an interrupt. For example, one or more factors may be utilized in determining whether a rate of interrupts is lower than a predetermined threshold. For example, as illustrated in FIG. 21, one embodiment of the present disclosure utilizes one or more of a requested specified latency, a number of registered triggers, and/or a performance calculation. In this example, a privileged process 108 may invoke one or more methods or procedures to determine whether it should register a trigger memory associated with a sender 104 and receiver 106. The method or procedure can utilize as input the latency that a sender 104 is requesting in a request for a deferred interrupt. In the instance that the latency is short, it may not be efficient to register a trigger memory and the privileged process 108 may signal the sender 104 that it will not register it.

Additionally, or alternatively, the method or procedure may utilize the number of registered triggers it already is polling to determine whether to un-register a shared memory location 102. In this example, a privileged process 108 may determine that since it is registering multiple triggers already, one more trigger will not create too much overhead and decide to register the sender 104.

Additionally, or alternatively, in another example the method or procedure may utilize input indicating how many CPU cycles it would take to poll a trigger against how many cycles will be utilized in the event that an interrupt occurs. If the CPU cycles required to monitor the trigger memory 118 are greater than the cost of taking the interrupt the privileged process 108 may refuse to register the trigger memory 118.

FIG. 22 illustrates the example operational flow 2000 of FIG. 20 including an additional operation 2208. As depicted by FIG. 22, the example operational flow 2000 may additionally include an operation that illustrates receiving a request to send an interrupt to an associated receiver, wherein the trigger memory is un-registered; and registering the trigger memory when the rate of interrupts exceeds the predetermined threshold. In the instance where the memory location 102 is not longer registered, the sender 104 may still request deferred interrupts, however since the trigger memory 118 is not actively monitored by the privileged process 108 the sender 104 must push an indication that a deferred interrupt was set in trigger memory 118 to the privileged process 108. In this instance, the privileged process 108 may determine whether or not to monitor the trigger memory 118 similar to that described above with respect to FIG. 20.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer system configured to send asynchronous messages over a channel comprising:
    a processor;
    a memory coupled to the processor, the memory including executable instructions, comprising:
        instructions for establishing a memory location shared between a virtual machine executing on the computer system and an operating system executing on the computer system;
        instructions for writing, by the virtual machine, a message to the memory location;
        instructions for requesting, by the virtual machine, that an interrupt be sent to the operating system after a specified latency has elapsed, wherein the operating system is configured to check the memory location and read messages stored therein in response to receiving the interrupt;
        instructions for storing a pending interrupt in a trigger memory in response to the request; and
        instructions for sending the interrupt to the operating system in response to determining that the specified latency has elapsed.

2. The computer system of claim 1, wherein the memory further comprises:
    instructions for polling, by the operating system, the trigger memory for the pending interrupt before the specified latency has elapsed;
    instructions for canceling the pending interrupt; and
    instructions for processing at least one message in the memory location.

3. The computer system of claim 1, wherein the memory further comprises:
    instructions for polling, by the operating system, the trigger memory for the pending interrupt when writing a second message to the memory location.

4. The computer system of claim 2, wherein the instructions for requesting that an interrupt be sent include instructions for writing a setting value to the trigger memory, and the instructions for canceling the pending interrupt include instructions for writing a canceling value to the trigger memory.

5. The computer system of claim 1, wherein the memory further comprises:
    instructions for polling, by the operating system, the trigger memory in response to a signal selected from a group of signals including signals indicative of an message initiation, a message completion, and an unrelated hardware interrupt.

6. The computer system of claim 1, wherein the memory further comprises:
    instructions for polling, by the operating system, the trigger memory in response to receiving at least one signal selected from a group of signals indicative of a confirmation message and a completion message.

7. The computer system of claim 1, wherein the memory further comprises:
    instructions for writing, by the virtual machine, at least one more additional message into the memory location before the specified latency has elapsed in response to detecting the pending interrupt.

8. The computer system of claim 1, wherein the memory further comprises:

instructions for determining a rate at which at least one of an input/output device, the virtual machine, and the operating system process messages stored in the memory location; and instructions for utilizing, by the virtual machine, the rate when requesting the specified latency.

9. A computer readable storage medium including processor executable instructions for sending an interrupt deferred for a specified latency, the computer readable storage medium comprising:

instructions for establishing a memory location shared between a process and a virtual machine;

instructions for registering a trigger memory with a privileged process, wherein the trigger memory is associated with the memory location;

instructions for polling, by the privileged process, the trigger memory to determine that the virtual machine has set a trigger associated with a specified latency, wherein the specific latency is a value indicative of an amount of time and the specific latency is set based on a characteristic of a message stored in the memory location; and instructions for sending an interrupt to the process in response to determining that the trigger is set and the specified latency has elapsed, wherein the process is configured to check the memory location and read messages stored therein in response to receiving an interrupt.

10. The computer readable storage medium of claim 9, wherein the trigger memory is polled during at least one control switch to the privileged process.

11. The computer readable storage medium of claim 9, further comprising:

instructions for determining a time interval between control switches;

instructions for determining that the time interval between control switches is less than the specified latency associated with the trigger; and instructions for omitting the polling of the trigger during at least one control switch.

12. The computer readable storage medium of claim 9, further comprising:

instructions for determining a time interval between control switches;

instructions for determining that the time interval between control switches is greater than the specified latency of at least one trigger; and instructions for forcing at least one additional control switch, and polling the trigger memory during the at least one forced control switch.

13. The computer readable storage medium of claim 9, further comprising:

instructions for dividing a plurality of trigger memories into a plurality of trigger memory sets, assigning each trigger memory set to one of a plurality of processors; and instructions for instructing a specific processor of the plurality processors to check at least one trigger memory in a trigger memory set that the specific processor was not assigned.

14. The computer readable storage medium of claim 13, further comprising:

instructions for polling a trigger memory set; and instructions for sending interrupts for triggers in the trigger memory set before a processor associated with monitoring the trigger memory set enters an idle state.

15. The computer readable storage medium of claim 9, further comprising:

instructions for identifying that a trigger has been set and recording the time that the trigger was identified; and instructions for calculating whether the specified latency has elapsed based on a current time and the recorded time.

16. The computer readable storage medium of claim 9, wherein the trigger includes information indicating a time the trigger was set.

17. The computer readable storage medium of claim 9, wherein a trigger with a specified latency can be manipulated without initiating a control switch to a privileged process.

18. A method for sending deferred interrupt to a process comprising:

establishing a memory location shared between an operating system and a virtual machine, the memory location configured to store a message sent from the virtual machine to the operating system;

determining that a rate of interrupts sent to the operating system is greater than a predetermined threshold;

registering a trigger memory associated with the memory location in response to determining that the rate of interrupts is greater than the predetermined threshold, the trigger memory configured to allow the virtual machine to set a trigger indicating that an interrupt is needed after a specified latency;

determining that the trigger was set and the specified latency has elapsed; and sending an interrupt to the operating system.

19. The method of claim 18, wherein the rate of interrupts is determined based at least one of a requested specified latency, a number of registered triggers, and a performance calculation, wherein the performance calculation includes balancing the performance costs of polling the trigger against the performance costs of calling a privileged process to send an interrupt.

20. The method of claim 18, further comprising:

determining that the rate of interrupts is lower than a predetermined threshold;

un-registering the trigger memory;

receiving, by a privileged process, a request to send an interrupt to the operating system; and immediately sending, by the privileged process, an interrupt to the operating system.

* * * * *